United States Patent
Laar et al.

(10) Patent No.: US 8,207,327 B2
(45) Date of Patent: Jun. 26, 2012

(54) CATALYST AND PROCESS FOR HYDROGENATING ORGANIC COMPOUNDS COMPRISING HYDROGENATABLE GROUPS

(75) Inventors: Frederik Van Laar, Dubai (AE); Michael Becker, Offenburg (DE); Ekkehard Schwab, Neustadt (DE); Jochem Henkelmann, Mannheim (DE); Peter Polanek, Speyer (DE)

(73) Assignee: BASF SE, Ludwigshafen (DE)

( * ) Notice: Subject to any disclaimer, the term of this patent is extended or adjusted under 35 U.S.C. 154(b) by 1221 days.

(21) Appl. No.: 11/993,777

(22) PCT Filed: Jun. 20, 2006

(86) PCT No.: PCT/EP2006/063323
§ 371 (c)(1), (2), (4) Date: Dec. 21, 2007

(87) PCT Pub. No.: WO2006/136541
PCT Pub. Date: Dec. 28, 2006

(65) Prior Publication Data
US 2010/0152436 A1    Jun. 17, 2010

(30) Foreign Application Priority Data
Jun. 22, 2005    (DE) .......................... 10 2005 029 200

(51) Int. Cl.
| C13K 5/00 | (2006.01) |
| C13K 7/00 | (2006.01) |
| C07H 3/00 | (2006.01) |
| C07H 1/00 | (2006.01) |
| C08B 37/00 | (2006.01) |
| C07C 69/74 | (2006.01) |
| C07C 35/08 | (2006.01) |
| C07C 29/20 | (2006.01) |
| C07C 5/10 | (2006.01) |
| B01J 23/00 | (2006.01) |
| B01J 21/00 | (2006.01) |
| B01J 20/00 | (2006.01) |

(52) U.S. Cl. .................... 536/123.13; 536/124; 560/127; 568/835; 585/269; 502/242; 502/243; 502/250; 502/251; 502/252; 502/261; 502/326; 502/328; 502/330; 502/340; 502/344; 502/349; 502/350; 502/407; 502/410; 502/411; 502/439

(58) Field of Classification Search .................. 502/250, 502/261, 439, 242, 243, 251, 252, 326, 328, 502/330, 340, 344, 349, 350, 407, 410, 411; 568/835; 536/123.13, 124; 585/269; 560/127
See application file for complete search history.

(56) References Cited

U.S. PATENT DOCUMENTS

| 4,072,628 | A | 2/1978 | Kruse et al. |
| 4,923,842 | A * | 5/1990 | Summers ....................... 502/261 |
| 5,102,850 | A * | 4/1992 | Sanchez et al. ............... 502/261 |
| 5,399,535 | A * | 3/1995 | Whitman ........................ 501/80 |
| 6,388,149 | B2 * | 5/2002 | Ruhl et al. ..................... 585/254 |
| 6,432,861 | B1 * | 8/2002 | Breitscheidel et al. ........ 502/103 |
| 7,030,052 | B2 * | 4/2006 | Stochniol et al. ............. 502/182 |
| 2001/0048970 | A1 | 12/2001 | Hagemeyer et al. |
| 2004/0097661 | A1 * | 5/2004 | Finke et al. ................... 525/453 |
| 2004/0097752 | A1 | 5/2004 | Lettmann et al. |
| 2004/0176549 | A1 | 9/2004 | Bottcher et al. |
| 2004/0176619 | A1 | 9/2004 | Vanoppen et al. |
| 2004/0192792 | A1 | 9/2004 | Espinoza et al. |
| 2004/0199033 | A1 | 10/2004 | Bottcher et al. |
| 2007/0112210 | A1 | 5/2007 | Arndt et al. |
| 2007/0149793 | A1 | 6/2007 | Arndt et al. |

FOREIGN PATENT DOCUMENTS

| BE | 882279 | | 7/1980 |
| DE | 198 27 844 | A1 | 12/1999 |
| DE | 101 28 204 | A1 | 12/2002 |
| DE | 101 28 205 | A1 | 12/2002 |
| DE | 101 28 242 | A1 | 12/2002 |
| DE | 103 61 151 | A1 | 7/2005 |
| DE | 103 61 157 | A1 | 7/2005 |
| DE | 10 2004 055 764 | A1 | 5/2006 |
| EP | 0 094 684 | A | 11/1983 |
| EP | 1 420 012 | A1 | 5/2004 |
| WO | WO-02100538 | | 12/2002 |
| WO | WO-2005/061105 | A1 | 7/2005 |
| WO | WO-2005/061106 | | 7/2005 |

OTHER PUBLICATIONS

International Search Report for International Application No. PCT/EP2006/063323 dated Dec. 1, 2006.

* cited by examiner

Primary Examiner — Cam N. Nguyen
(74) Attorney, Agent, or Firm — Connolly Bove Lodge & Hutz LLP

(57) ABSTRACT

The invention relates to a shell catalyst containing ruthenium as an active metal, alone or together with at least one other metal of the auxiliary group IB, VIIB or VIII of the periodical system of the elements (CAS version), and applied to a carrier containing silicon dioxide as a carrier material. The invention also relates to a method for producing said shell catalyst, and to a method for hydrogenating an organic compound containing hydrogenable groups, preferably for hydrogenating a carbocyclic aromatic group to form the corresponding carbocyclic aliphatic groups or for hydrogenating aldehydes to form the corresponding alcohols, using the inventive shell catalyst. The invention further relates to the use of the inventive shell catalyst for hydrogenating an organic compound containing hydrogenable groups, preferably for hydrogenating a carbocyclic aromatic group to form the corresponding carbocyclic aliphatic groups or for hydrogenating aldehydes to form the corresponding alcohols.

20 Claims, No Drawings

CATALYST AND PROCESS FOR HYDROGENATING ORGANIC COMPOUNDS COMPRISING HYDROGENATABLE GROUPS

CROSS REFERENCE TO RELATED APPLICATIONS

This application is a National Phase filing under 35 U.S.C. §371 of PCT/EP2006/063323 filed Jun. 20, 2006, which claims priority to Patent Application No. 102005029200.3, filed in Germany on Jun. 22, 2005. The entire contents of each of the above-applications are incorporated herein by reference.

The present invention relates to a coated catalyst comprising, as an active metal, ruthenium alone or together with at least one further metal of transition groups IB, VIIB or VIII of the Periodic Table of the Elements (CAS version), applied to a support comprising silicon dioxide as a support material, to a process for preparing this coated catalyst, to a process for hydrogenating an organic compound which comprises hydrogenatable groups, preferably for hydrogenating a carbocyclic aromatic group to the corresponding carbocyclic aliphatic groups or for hydrogenating aldehydes to the corresponding alcohols, using the inventive coated catalyst, and also to the use of the inventive coated catalyst for hydrogenating an organic compound which comprises hydrogenatable groups, preferably for hydrogenating a carbocyclic aromatic group to the corresponding carbocyclic aliphatic groups or for hydrogenating aldehydes to the corresponding alcohols.

The literature discloses various hydrogenation processes. Of industrial interest are especially the hydrogenation of substituted and unsubstituted aromatics and also benzenepolycarboxylic acids, phenol derivatives and aniline derivatives. However, the hydrogenation products of compounds with C—C, C—O, N—O and C—N multiple bonds and polymers are also of industrial interest.

Cycloaliphatic alcohols, especially alkylcyclohexanols, are important intermediates for the preparation of various fragrances, medicaments and other organic fine chemicals. The hydrogenation products of benzenepolycarboxylic acids or derivatives thereof to the corresponding cyclohexanepolycarboxylic acids or derivatives thereof are used, for example, as plasticizers for polymers. The hydrogenation of benzene to cyclohexane is likewise of industrial interest. Cycloaliphatic amines, especially optionally substituted cyclohexylamines and dicyclohexylamines find use for producing antiaging compositions for rubbers and plastics, as anticorrosion compositions and also as precursors for crop protection compositions and textile assistants. Cycloaliphatic diamines are additionally used in the preparation of polyamide and polyurethane resins and also find use as hardeners for epoxy resins.

The ring hydrogenation of aromatics has been known for some time and can be catalyzed by many metals, for example by supported catalysts which have nickel, cobalt or noble metals as active metals.

Among the supported catalysts which have noble metals as active metals, a known example is that of ruthenium catalysts which comprise aluminum oxides or silicon dioxides as support materials.

For instance, DE-A 101 282 05 and DE-A 101 282 42 relate to ruthenium catalysts which are obtainable by single or repeated treatment of a support material based on amorphous silicon dioxide with a halogen-free aqueous solution of a low molecular weight ruthenium compound and subsequent drying of the treated support material at a temperature below 200° C., subsequent reduction of the resulting solid with hydrogen at a temperature in the range from 100 to 350° C., the reduction being effected directly after the treatment of the support material with an aqueous solution of a low molecular weight ruthenium compound. According to DE-A 101 282 42, these catalysts may be used for hydrogenating aromatic compounds to the corresponding cycloaliphatic compounds. The catalysts disclosed in DE-A 101 282 05 and DE-A 101 282 42 have a content of ruthenium of from at least 0.1% by weight to 10% by weight. According to the examples, the ruthenium catalysts are prepared by impregnating support material comprising silicon dioxide with ruthenium(III) nitrosylnitrate and have a ruthenium content of 5% by weight and 1% by weight respectively. A disadvantage of the catalysts disclosed in DE-A 101 282 05 and DE-A 101 282 42 is the occurrence of side reactions in the hydrogenation of benzene to cyclohexane. Although these side reactions occur only in the trace region, this leads to a decrease in activity of the catalyst and to an increase of by-products which have to be removed in a costly and inconvenient manner for many applications. Known side reactions are the acid-catalyzed conversions to methylcyclopentane, cyclohexylbenzene and to n-hexane. In addition, dimerizations or oligomerizations occur, which can lead to deposition of carbon on the catalyst and thus to catalyst deactivation. Without being bound thereto, it is assumed that the formation of cyclohexene as a by-product in the hydrogenation of benzene to cyclohexane plays a great role in the dimerization or oligomerization. Cyclohexene can form firstly owing to hydrogen deficiency in the hydrogenation of benzene, but secondly also by cyclohexane being dehydrogenated to cyclohexene by the active metal ruthenium. It is assumed that, in the case of catalysts which have ruthenium distributed homogeneously over the catalyst up to slightly depleted in the core of the catalyst, owing to the presence of ruthenium in the core of the catalyst and also to local hydrogen limitation at the core of the catalyst, the formation of cyclohexene is promoted, which leads to a decrease in activity during the hydrogenation of benzene to cyclohexane. Such a decrease in activity is observed in the catalysts prepared in DE-A 101 282 05 and DE-A 101 282 42 by impregnation of silicon dioxide support material with a solution of ruthenium(III) nitrosylnitrate.

The provision of catalysts which have a higher activity in the hydrogenation of organic compounds which comprise hydrogenatable groups over a prolonged period, especially in the hydrogenation of aromatic groups to the corresponding cycloaliphatic groups, than the catalysts disclosed in DE-A 101 282 05 and DE-A 101 282 42 is therefore desirable.

Suitable catalysts for achieving this object are coated catalysts, i.e. catalysts which have a distinctly higher concentration of active metal on the catalyst surface than in the catalyst core.

Coated catalysts are known in the prior art and can be obtained by different processes. For example, inorganic support materials can be impregnated with a metal salt solution of the catalytically active metal, which can be followed by a drying and reduction step. Especially in the case of coated catalysts which comprise ruthenium on silicon dioxide, it is, however, difficult to obtain sharp coating profiles by the classical impregnation process, as can be seen, for example, by the catalysts according to DE-A 101 282 05 and DE-A 101 282 42. In addition, coated catalysts can be prepared by chemical vapor deposition (CVD) processes. For instance, DE-A 19827844 relates to a process for preparing coated catalysts with defined coating thickness on porous ceramic supports. In this case, the support material is prepared with precursors which can be evaporated without decomposition by the CVD process with subsequent fixing of the metals by simultaneous or subsequent thermal or chemical reduction. The precursors used are in particular allylcyclopentadienylpalladium and trimethylphosphinemethylgold. However, the CVD process is complicated since the evaporated metal precursor has to be conducted onto the catalyst support with the aid of a carrier gas. In addition, specific metal precursors are required since not all metal precursors exhibit suitable evaporation behavior.

Suitable impregnation processes for preparing coated catalysts are disclosed in the following documents:

US 2004/0192792 A1 relates to coated catalysts in which more than 60% by weight of the catalytically active metal is present in an outer region of the catalyst, this outer region having a thickness of not more than 200 μm. These catalysts are suitable for preparing synthesis gas from hydrocarbons (for example natural gas). The use of ruthenium as an active metal is not mentioned in US 2004/0192792 A1. Furthermore, only aluminum oxide supports are used according to the examples. The hydrogenation of aromatics is likewise not mentioned in US 2004/0192792 A1.

EP-A 0 094 684 relates to coated catalysts which comprise platinum or other noble metals substantially on the surface. These coated catalysts are prepared by impregnating a support with hexaammoniumplatinum tetrasulfide. According to EP-A 0 094 684, the supports used are preferably SnO/ZnAl$_2$O$_4$ supports. Silicon dioxide as a support material is not mentioned. These catalysts can be used according to EP-A 0 904 684 in numerous processes, including in hydrogenation processes. Preference is given to the use of these catalysts in the dehydrogenation of alkanes.

EP-A 1 420 012 discloses a process for preparing aliphatic isocyanates from aromatic isocyanates. The catalysts used are specific catalysts which have ruthenium as an active metal and have a meso-/macroporous support material having a BET surface area in the range from >30 m$^2$/g to <70 m$^2$/g. According to the examples, catalysts based on aluminum oxide support materials which are impregnated with ruthenium(III) nitrate solutions are used.

The patent applications of Dec. 18, 2004, which had not been published at the priority date of the present application, with the reference numbers PCT/EP/04/014454 (WO2005/061105) and PCT/EP/04/014455 (WO2005/061106) disclose ruthenium heterogeneous catalysts which comprise silicon dioxide as the support material and their use in hydrogenation processes.

As already mentioned above, it is difficult to obtain sharp coating profiles by classical impregnation processes. This means that, although coated catalysts are frequently obtained, they feature presence of significant amounts of active metal particles in the core. The presence of substantial amounts of active metal particles in the core, however, has a disadvantageous effect on the activity of the catalyst in hydrogenation processes, especially the activity in long-term use, and also by-product formation in hydrogenation processes. The presence of significant amounts of active metal particles in the core is disadvantageous especially when sufficient hydrogen is not available to the active metal particles in the core, which may be the case especially in rapid reactions in which hydrogen replenishment is limited.

It is therefore an object of the present invention to provide catalysts which have a very high activity in hydrogenation processes even in long-term use, the amount of active metal being at a minimum, since the active metals used are noble metals which are expensive. In spite of high activity and small amount of active metal, by-product formation should be low.

The achievement of this object starts from a coated catalyst comprising, as an active metal, ruthenium alone or together with at least one further metal of transition groups IB, VIIB or VIII of the Periodic Table of the Elements (CAS version), applied to a support comprising silicon dioxide as a support material.

In the inventive coated catalyst, the amount of active metal is <1% by weight, preferably from 0.1 to 0.5% by weight, more preferably from 0.25 to 0.35% by weight, based on the total weight of the catalyst, and at least 60% by weight, more preferably 80% by weight of the active metal, based on the total amount of the active metal, is present in the coating of the catalyst up to a penetration depth of 200 μm. The aforementioned data are determined by means of SEM (scanning electron microscopy) EPMA (electron probe microanalysis)-EDXS (energy dispersive X-ray spectroscopy) and constitute average values. Further information regarding the aforementioned analysis methods and techniques are disclosed, for example, in "Spectroscopy in Catalysis" by J. W. Niemantsverdriet, VCH, 1995.

A feature of the inventive coated catalyst is that the predominant amount of the active metal is present in the coating up to a penetration depth of 200 μm, i.e. close to the surface of the coated catalyst. In contrast, only a very small amount of the active metal, if any, is present in the interior (core) of the catalyst. It has been found that, surprisingly, the inventive catalyst, in spite of the small amount of active metal, has a very high activity in the hydrogenation of organic compounds which comprise hydrogenatable groups, especially in the hydrogenation of carbocyclic aromatic groups with very good selectivities. In particular, the activity of the inventive catalyst does not decrease over a long hydrogenation period.

Very particular preference is given to an inventive coated catalyst in which no active metal can be detected in the interior of the catalyst, i.e. active metal is present only in the outermost coating, for example in a zone up to a penetration depth of 100-200 μm.

In a further particularly preferred embodiment, a feature of the inventive coated catalyst is that, in (FEG)-TEM (Field Emission Gun-Transmission Electron. Microscopy) with EDXS, active metal particles can be detected only in the outermost 200 μm, preferably 100 μm, most preferably 50 μm (penetration depth). Particles smaller than 1 nm cannot be detected.

The active metal used may be ruthenium alone or together with at least one further metal of transition groups IB, VIIB or VIII of the Periodic Table of the Elements (CAS version). Suitable further active metals in addition to ruthenium are, for example, platinum, rhodium, palladium, iridium, cobalt or nickel or a mixture of two or more thereof. Among the metals of transition groups IB and/or VIIB of the Periodic Table of the Elements which can likewise be used, suitable metals are, for example, copper and/or rhenium. Preference is given to using ruthenium alone as the active metal or together with platinum or iridium in the inventive coated catalyst; very particular preference is given to using ruthenium alone as the active metal.

The inventive coated catalyst exhibits the aforementioned very high activity at a low loading with active metal which is <1% by weight based on the total weight of the catalyst. The amount of the active metal in the inventive coated catalyst is preferably from 0.1 to 0.5% by weight, more preferably from 0.25 to 0.35% by weight. It has been found that the penetration depth of the active metal into the support material is dependent upon the loading of the catalyst with active metal. Even in the case of loading of the catalyst with 1% by weight or more, for example in the case of loading with 1.5% by weight, a substantial amount of active metal is present in the interior of the catalyst, i.e. in a penetration depth of from 300 to 1000 μm, which impairs the activity of the hydrogenation catalyst, especially the activity over a long hydrogenation period, especially in the case of rapid reactions, where hydrogen deficiency can occur in the interior of the catalyst (core).

According to the invention, in the inventive coated catalyst, at least 60% by weight of the active metal, based on the total amount of the active metal, is present in the coating of the catalyst up to a penetration depth of 200 μm. In the inventive coated catalyst, preferably at least 80% of the active metal, based on the total amount of the active metal, is present in the coating of the catalyst up to a penetration depth of 200 μm. Very particular preference is given to an inventive coated catalyst in which no active metal can be detected in the interior of the catalyst, i.e. active metal is present only in the outermost coating, for example in a zone up to a penetration depth of 100-200 μm. In a further preferred embodiment, 60% by weight, preferably 80% by weight, based on the total amount of the active metal, is present in the coating of the catalyst up to a penetration depth of 150 μm. The aforementioned data are determined by means of SEM (scanning electron microscopy) EPMA (electron probe microanalysis)-EDXS (energy dispersive X-ray spectroscopy) and constitute averaged values. To determine the penetration depth of the active metal particles, a plurality of catalyst particles (for example 3, 4 or 5) are abraded transverse to the extrudate axis (when the catalyst is present in the form of extrudates). By means of line scans, the profiles of the active metal/Si concentration ratios are then recorded. On each measurement line, a plurality of, for example 15-20, measurement points are measured at equal intervals; the measurement spot size is approx. 10 μm*10 μm. After integration of the amount of active metal over the depth, the frequency of the active metal in a zone can be determined.

Most preferably, the amount of the active metal, based on the concentration ratio of active metal to Si, on the surface of the coated catalyst is from 2 to 25%, preferably from 4 to 10%, more preferably from 4 to 6%, determined by means of SEM EPMA-EDXS. The surface is analyzed by means of analyses of regions of 800 μm×2000 μm and with an information depth of approx. 2 μm. The elemental composition is determined in % by weight (normalized to 100%). The mean concentration ratio (active metal/Si) is averaged over 10 measurement regions.

In the context of the present application, the surface of the coated catalyst is understood to mean the outer coating of the catalyst up to a penetration depth of approx. 2 μm. This penetration depth corresponds to the information depth in the aforementioned surface analysis.

Very particular preference is given to a coated catalyst in which the amount of the active metal, based on the weight ratio of active metal to Si (w/w in %), on the surface of the coated catalyst is from 4 to 6% by weight, from 1.5 to 3% by weight in a penetration depth of 50 μm and from 0.5 to 2% by weight in the region of penetration depth from 50 to 150 μm, determined by means of SEM EPMA (EDXS). The values stated constitute averaged values.

Moreover, the size of the active metal particles preferably decreases with increasing penetration depth, determined by means of (FEG)-TEM analysis.

The active metal is present in the inventive coated catalyst preferably partly or fully in crystalline form. In preferred cases, ultrafine crystalline active metal can be detected in the coating of the inventive coated catalyst by means of SAD (Selected Area Diffraction) or XRD (X-Ray Diffraction).

The inventive coated catalyst may additionally comprise alkaline earth metal ions ($M^{2+}$), i.e. M=Be, Mg, Ca, Sr and/or Ba, in particular Mg and/or Ca, most preferably Mg. The content of alkaline earth metal ion(s) ($M^{2+}$) in the catalyst is preferably from 0.01 to 1% by weight, in particular from 0.05 to 0.5% by weight, very particularly from 0.1 to 0.25% by weight, based in each case on the weight of the silicon dioxide support material.

An essential constituent of the inventive catalysts is the support material based on silicon dioxide, generally amorphous silicon dioxide. In this context, the term "amorphous" is understood to mean that the fraction of crystalline silicon dioxide phases makes up less than 10% by weight of the support material. However, the support materials used to prepare the catalysts may have superstructures which are formed by regular arrangement of pores in the support material.

Useful support materials are in principle amorphous silicon dioxide types which consist of silicon dioxide at least to an extent of 90% by weight, and the remaining 10% by weight, preferably not more than 5% by weight, of the support material may also be another oxidic material, for example MgO, CaO, $TiO_2$, $ZrO_2$, $Fe_2O_3$ and/or alkali metal oxide.

In a preferred embodiment of the invention, the support material is halogen-free, especially chlorine-free, i.e. the content of halogen in the support material is less than 500 ppm by weight, for example in the range from 0 to 400 ppm by weight. Preference is thus given to a coated catalyst which comprises less than 0.05% by weight of halide (determined by ion chromatography) based on the total weight of the catalyst.

Preference is given to support materials which have a specific surface area in the range from 30 to 700 $m^2/g$, preferably from 30 to 450 $m^2/g$ (BET surface area to DIN 66131).

Suitable amorphous support materials based on silicon dioxide are familiar to those skilled in the art and commercially available (see, for example, O. W. Flörke, "Silica" in Ullmann's Encyclopedia of Industrial Chemistry $6^{th}$ Edition on CD-ROM). They may be either of natural origin or have been synthetically produced. Examples of suitable amorphous support materials based on silicon dioxide are silica gels, kieselguhr, pyrogenic silicas and precipitated silicas. In a preferred embodiment of the invention, the catalysts have silica gels as support materials.

Depending on the embodiment of the invention, the support material may have different shape. When the process in which the inventive coated catalysts are used is configured as a suspension process, the inventive catalysts will typically be prepared by using the support material in the form of a fine powder. The powder preferably has particle sizes in the range from 1 to 200 μm, in particular from 1 to 100 μm. When the inventive coated catalyst is used in fixed catalyst beds, use is typically made of moldings of the support material which are obtainable, for example, by extruding or tableting, and which may have, for example, the shape of spheres, tablets, cylinders, extrudates, rings or hollow cylinders, stars and the like. The dimensions of these moldings vary typically within the range from 0.5 mm to 25 mm. Frequently, catalyst extrudates with extrudate diameters of from 1.0 to 5 mm and extrudate lengths of from 2 to 25 mm are used. It is generally possible to achieve higher activities with smaller extrudates; however, these often do not have sufficient mechanical stability in the hydrogenation process. Very particular preference is therefore given to using extrudates with extrudate diameters in the range from 1.5 to 3 mm.

The inventive coated catalysts are prepared preferably by first impregnating the support material once or more than once with a solution of ruthenium(III) acetate alone or together with a solution of at least one further salt of metals of transition groups IB, VIIB or VIII of the Periodic Table of the Elements (CAS version), drying the resulting solid and subsequent reduction, the solution of the at least one further salt of metals of transition groups IB, VIIB or VIII of the Periodic Table of the Elements being applicable in one or more impregnation steps together with the solution of ruthenium (III) acetate or in one or more impregnation steps separately from the solution of ruthenium(III) acetate. The individual process steps are described in detail below.

The present application thus further provides a process for preparing the inventive coated catalyst, comprising the steps of:
a) impregnating the support material comprising silicon dioxide once or more than once with a solution of ruthenium(III) acetate alone or together with a solution of at least one further salt of metals of transition groups IB, VIIB or VIII of the Periodic Table of the Elements (CAS version);
b) subsequent drying;
c) subsequent reduction;
the solution of the at least one further salt of metals of transition groups IB, VIIB or VIII of the Periodic Table of the Elements being applicable in one or more impregnation steps together with the solution of ruthenium(III) acetate or in one or more impregnation steps separately from the solution of ruthenium(III) acetate.

Step A)

In step a), the support material comprising the silicon dioxide is impregnated once or more than once with a solution of ruthenium(III) acetate alone or together with at least one further dissolved salt of metals of transition groups IB, VIIB or VIII of the Periodic Table of the Elements (CAS version). Since the amount of active metal in the inventive coated catalyst is very small, a simple impregnation is effected in a preferred embodiment. Ruthenium(III) acetate and the salts of metals of transition groups IB, VIIB or VIII of the Periodic Table of the Elements constitute active metal precursors. It has been found that, surprisingly, use of ruthenium(III) acetate as a precursor can afford coated catalysts which are notable, among other features, in that the significant portion of the active metal, preferably ruthenium alone, is present in the coated catalyst up to a penetration depth of 200 µm. The interior of the coated catalyst has only little active metal, if any. When, in contrast, ruthenium(III) nitrosylnitrate is used as a precursor, as disclosed in the examples in DE-A 101 28 205 and DE-A 101 28 242, a ruthenium catalyst is obtained which comprises ruthenium distributed homogeneously over the catalyst up to slightly depleted in the interior of the catalyst.

Suitable solvents for providing the solution of ruthenium (III) acetate or the solution of at least one further salt of metals of transition groups IB, VIIB or VIII of the Periodic Table of the Elements are water or else mixtures of water or solvents with up to 50% by volume of one or more water- or solvent-miscible organic solvents, for example mixtures with $C_1$-$C_4$-alkanols such as methanol, ethanol, n-propanol or isopropanol. Aqueous acetic acid or glacial acetic acid may likewise be used. All mixtures should be selected such that a solution or phase is present. Preferred solvents are acetic acid, water or mixtures thereof. Particular preference is given to using a mixture of water and acetic acid as a solvent, since ruthenium (III) acetate is typically present dissolved in acetic acid or glacial acetic acid. However, ruthenium(III) acetate may also be used as a solid after dissolution. The inventive catalyst may also be prepared without use of water.

The solution of the at least one further salt of metals of transition groups IB, VIIB or VIII of the Periodic Table of the Elements can be applied in one or more impregnation steps together with the solution of ruthenium(III) acetate or in one or more impregnation steps separately from the solution of ruthenium(III) acetate. This means that the impregnation can be effected with one solution which comprises ruthenium(III) acetate and also at least one further salt of metals of transition groups IB, VIIB or VIII of the Periodic Table of the Elements. The impregnation with this solution can be effected once or more than once. However, it is likewise possible that impregnation is effected first with a ruthenium(III) acetate solution and then, in a separate impregnation step, with a solution which comprises at least one further salt of metals of transition groups IB, VIIB or VIII of the Periodic Table of the Elements. The sequence of the impregnation steps may also be reversed. It is likewise possible that one of the two impregnation steps or both impregnation steps are repeated once or more than one in any sequence. Each impregnation step is typically followed by drying.

Suitable salts of further metals of transition groups IB, VIIB or VIII of the Periodic Table of the Elements which can be used in the impregnation step are, for example, nitrates, acetonates and acetates, preference being given to acetates.

Particular preference is given to effecting impregnation with a solution of ruthenium(III) acetate alone in one impregnation step.

The impregnation of the support material can be effected in different ways and depends in a known manner upon the form of the support material. For example, the support material can be sprayed or flushed with the precursor solution or the support material can be suspended in the precursor solution. For example, the support material can be suspended in an aqueous solution of the active metal precursor and, after a certain time, filtered off from the aqueous supernatant. The amount of liquid absorbed and the active metal concentration of the solution can then be used to control the active metal content of the catalyst in a simple manner. The support material can also be impregnated by, for example, treating the support with a defined amount of the solution of the active metal precursor which corresponds to the maximum amount of liquid that the support material can absorb. For this purpose, the support material can, for example, be sprayed with the required amount of liquid. Suitable apparatus for this purpose is the apparatus used customarily for mixing liquids with solids (see Vauck/Müller, Grundoperationen chemiseher Verfahrenstechnik [Basic operations in chemical process technology], $10^{th}$ edition, Deutscher Verlag für Grundstoffindustrie, 1994, p. 405 ff.), for example tumble driers, impregnating drums, drum mixers, paddle mixers and the like. Monolithic supports are typically flushed with the aqueous solutions of the active metal precursor.

The solutions used for impregnation are preferably low-halogen, especially low-chlorine, i.e. they comprise no or less than 500 ppm by weight, especially less than 100 ppm by weight of halogen, for example from 0 to <80 ppm by weight of halogen based on the total weight of the solution.

The concentration of the active metal precursor in the solutions depends, by its nature, upon the amount of active metal precursor to be applied and the absorption capacity of the support material for the solution and is <20% by weight, preferably from 0.01 to 6% by weight, more preferably from 0.1 to 1.1% by weight, based on the total mass of the solution used.

Step B)

The drying can be effected by customary processes for drying solids while maintaining the upper temperature limits specified below. The maintenance of the upper limit of the drying temperatures is important for the quality, i.e. the activity, of the catalyst. Exceedance of the drying temperatures specified below leads to a distinct loss of activity. Calcination of the support at higher temperatures, for example above 300°

C. or even 400° C., as the prior art proposes, is not only superfluous but also has a disadvantageous effect on the activity of the catalyst. To achieve sufficient drying rates, the drying is effected preferably at elevated temperature, preferably at ≦180° C., particularly at ≦160° C., and at least 40° C., in particular at least 70° C., especially at least 100° C., very particularly in the range from 110° C. to 150° C.

The solid impregnated with the active metal precursor is dried typically under standard pressure, and the drying can also be promoted by employing reduced pressure. Frequently, the drying will be promoted by passing a gas stream over or through the material to be dried, for example air or nitrogen.

The drying time depends, by its nature, upon the desired degree of drying and the drying temperature and is preferably in the range from 1 h to 30 h, preferably in the range from 2 to 10 h.

The drying of the treated support material is preferably carried out to such an extent that the content of water or of volatile solvent constituents before the subsequent reduction makes up less than 5% by weight, in particular not more than 2% by weight, based on the total weight of the solid. The weight fractions specified relate to the weight loss of the solid, determined at a temperature of 160° C., a pressure of 1 bar and a time of 10 min. In this way, the activity of the catalysts used in accordance with the invention can be enhanced further.

Step C)

The solid obtained after the drying is converted to its catalytically active form by reducing the solid at temperatures in the range of generally from 150° C. to 450° C., preferably from 250° C. to 350° C., in a manner known per se.

For this purpose, the support material is contacted with hydrogen or a mixture of hydrogen and an inert gas at the above-specified temperatures. The absolute hydrogen pressure is of minor importance for the result of the reduction and can, for example, be varied within the range from 0.2 bar to 1.5 bar. Frequently, the catalyst material is hydrogenated at standard hydrogen pressure in a hydrogen stream. Preference is given to effecting the reduction with movement of the solid, for example by reducing the solid in a rotary tube oven or a rotary sphere oven. In this way, the activity of the inventive catalysts can be enhanced further. The hydrogen used is preferably free of catalyst poisons such as compounds comprising CO and S, for example $H_2S$, COS and others.

The reduction can also be effected by means of organic reducing reagents such as hydrazine, formaldehyde, formates or acetates.

After the reduction, the catalyst can be passivated in a known manner to improve the handling, for example by treating the catalyst briefly with an oxygen-containing gas, for example air, but preferably with an inert gas mixture comprising from 1 to 10% by volume of oxygen. It is also possible here to use $CO_2$ or $CO_2/O_2$ mixtures.

The active catalyst may also be stored under an inert organic solvent, for example ethylene glycol.

To prepare the inventive coated catalyst, in a further embodiment, the active metal catalyst precursor, for example prepared as above or prepared as described in WO-A2-02/100538 (BASF AG), is impregnated with a solution of one or more alkaline earth metal(II) salts.

Preferred alkaline earth metal(II) salts are corresponding nitrates, especially magnesium nitrate and calcium nitrate.

The preferred solvent for the alkaline earth metal(II) salts in this impregnation step is water. The concentration of the alkaline earth metal(II) salt in the solvent is, for example, from 0.01 to 1 mol/liter.

For example, the active metal/$SiO_2$ catalyst installed in a tube is contacted with a stream of an aqueous solution of the alkaline earth metal salt. The catalyst to be impregnated may also be treated with a supernatant solution of the alkaline earth metal salt.

This preferably results in saturation of the active metal/$SiO_2$ catalyst, especially of its surface, with the alkaline earth metal ion(s) taking place.

Excess alkaline earth metal salt and unimmobilized alkaline earth metal ions is/are flushed from the catalyst ($H_2O$ flushing, catalyst washing).

For simplified handling, for example installation in a reactor tube, the inventive catalyst can be dried after the impregnation. For this purpose, the drying can be carried out in an oven at <200° C., for example at from 50 to 190° C., more preferably at <140° C., for example at from 60 to 130° C.

This impregnation process can be carried out ex situ or in situ: ex situ means before installation of the catalyst into the reactor; in situ means in the reactor (after the catalyst installation).

In one process variant, the catalyst can also be impregnated in situ with alkaline earth metal ions by adding alkaline earth metal ions, for example in the form of dissolved alkaline earth metal salts, to the solution of the aromatic substrate (reactant) to be hydrogenated. To this end, for example, the appropriate amount of salt is first dissolved in water and then added to the substrate dissolved in an organic solvent.

In one variant, it is found to be particularly advantageous when the inventive catalyst is used in the hydrogenation process according to the invention in combination with an alkaline earth metal ion-containing solution of the substrate to be hydrogenated. The content of alkaline earth metal ions in the solution of the substrate to be hydrogenated is generally from 1 to 100 ppm by weight, in particular from 2 to 10 ppm by weight.

As a result of the preparation, the active metal is present in the inventive catalysts in the form of a metallic active metal.

As a result of the use of halogen-free, especially chlorine-free, active metal precursors and solvents in the preparation of the inventive coated catalyst, the halide content, especially chloride content, of the inventive coated catalysts is additionally below 0.05% by weight (from 0 to <500 ppm by weight, for example in the range of 0-400 ppm by weight), based on the total weight of the catalyst. The chloride content is determined by ion chromatography, for example with the method described below.

In this document, all ppm data are to be understood as fractions by weight (ppm by weight) unless stated otherwise.

In a selected variant, it is preferred that the percentage ratio of the $Q_2$ and $Q_3$ structures determined by means of $^{29}Si$ solid-state NMR, $Q_2/Q_3$, is less than 25, preferably less than 20, more preferably less than 15, for example in the range from 0 to 14 or from 0.1 to 13. This also means that the degree of condensation of the silica in the support used is particularly high.

The $Q_n$ structures (n=2, 3, 4) are identified and the percentage ratio is determined by means of $^{29}Si$ solid-state NMR.

$Q_n=Si(OSi)_n(OH)_{4-n}$ where n=1, 2, 3 or 4.

When n=4, $Q_n$ is found at −110.8 ppm, when n=3 at −100.5 ppm and when n=2 at −90.7 ppm (standard: tetramethylsilane) ($Q_0$ and $Q_1$ were not identified). The analysis was carried out under the conditions of magic angle spinning at room temperature (20° C.) (MAS 5500 Hz) with cross-polarization (CP 5 ms) and using dipolar decoupling of $^1H$. Owing to the partial overlapping of the signals, the intensities were evaluated by means of line shape, analysis. The line shape analysis was carried out with a standard software package from Galactic Industries, by calculating a least squares fit iteratively.

The support material preferably does not comprise more than 1% by weight and in particular not more than 0.5% by weight and in particular <500 ppm by weight of aluminum oxide, calculated as $Al_2O_3$.

Since the condensation of silica can also be influenced by aluminum and iron, the total concentration of Al(III) and Fe(II and/or III) is preferably less than 300 ppm, more preferably less than 200 ppm, and is, for example, in the range from 0 to 180 ppm.

The fraction of alkali metal oxide results preferably from the preparation of the support material and can be up to 2% by weight. Frequently, it is less than 1% by weight. Also suitable are alkali metal oxide-free supports (0 to <0.1% by weight). The fraction of MgO, CaO, $TiO_2$ or of $ZrO_2$ may make up to 10% by weight of the support material and is preferably not more than 5% by weight. However, also suitable are support materials which do not comprise any detectable amounts of these metal oxides (from 0 to <0.1% by weight).

Because Al(III) and Fe(II and/or III) can give rise to acidic sites incorporated into silica, it is preferred that charge compensation is present in the carrier, preferably with alkaline earth metal cations ($M^{2+}$, M=Be, Mg, Ca, Sr, Ba). This means that the weight ratio of M(II) to (Al(III)+Fe(II and/or III)) is greater than 0.5, preferably >1, more preferably greater than 3.

The roman numerals in brackets after the element symbol mean the oxidation state of the element.

The present application further provides a coated catalyst prepared by the process according to the invention. It has been found that, surprisingly, in a preparation of coated catalysts which comprise as an active metal, ruthenium alone or together with at least one further metal of transition groups IB, VIIB or VIII of the Periodic Table of the Elements (CAS version), applied to a support comprising silicon dioxide as a support material, a distribution of the active metal can be achieved, the substantial portion of the active metal being present in the catalyst up to a penetration depth of 200 μm and the interior of the catalyst having little active metal, if any, when the precursor used in the impregnation step is ruthenium(III) acetate. The inventive coated catalyst preferably comprises ruthenium alone as an active metal. Preferred embodiments of catalysts which are preparable by the process according to the invention are mentioned above.

The inventive coated catalyst is preferably used as a hydrogenation catalyst. It is especially suitable for hydrogenating organic compounds which comprise hydrogenatable groups. The hydrogenatable groups may be groups which have the following structural units: C—C double bonds, C—C triple bonds, aromatic groups, C—N double bonds, C—N triple bonds, C—O double bonds, N—O double bonds, C—S double bonds, $NO_2$ groups, where the groups may also be present in polymers or cyclic structures, for example in unsaturated heterocycles. The hydrogenatable groups may each occur once or more than once in the organic compounds. It is also possible that the organic compounds have two or more different groups of the hydrogenatable groups mentioned. Depending on the hydrogenation conditions, it is possible in the latter case that only one or more of the hydrogenatable groups are hydrogenated.

Preference is given to using the inventive coated catalysts for hydrogenating a carbocyclic aromatic group to the corresponding carbocyclic aliphatic group or for hydrogenating aldehydes to the corresponding alcohols, most preferably for hydrogenating a carbocyclic aromatic group to the corresponding carbocyclic aliphatic group. Particular preference is given to fully hydrogenating the aromatic group, full hydrogenation being understood to mean conversion of the compound to be hydrogenated of generally >98%, preferably >99%, more preferably >99.5%, even more preferably >99.9%, in particular >99.99% and especially >99.995%.

In the case of use of the inventive coated catalyst for hydrogenating benzene to cyclohexane, the typical cyclohexane specifications which require a residual benzene content of <100 ppm (this corresponds to a benzene conversion of >99.99%) are fulfilled. The benzene conversion in a hydrogenation of benzene with the inventive coated catalyst is preferably >99.995%.

In the case of use of the inventive coated catalyst for hydrogenating aromatic dicarboxylic esters, especially phthalic esters to the corresponding dialkyl cyclohexanedicarboxylates, the typical specifications which require a residual content of the aromatic dicarboxylic ester, especially residual phthalic ester content; of <100 ppm (this corresponds to a conversion of >99.99%) are thus likewise fulfilled. The conversion in a hydrogenation of aromatic dicarboxylic esters, especially phthalic esters, with the inventive coated catalyst is preferably >99.995%.

The present application therefore further provides a process for hydrogenating an organic compound which comprises hydrogenatable groups, preferably for hydrogenating a carbocyclic aromatic group to the corresponding carbocyclic aliphatic group or for hydrogenating aldehydes to the corresponding alcohols, most preferably for hydrogenating a carbocyclic aromatic group to the corresponding carbocyclic aliphatic group, the inventive coated catalyst being used.

The carbocyclic group is preferably part of an aromatic hydrocarbon which has the following general formula:

in which the symbols are each defined as follows:

A is independently aryl or heteroaryl; A is preferably selected from phenyl, diphenyl, benzyl, dibenzyl, naphthyl, anthracene, pyridyl and quinoline; A is more preferably phenyl;

n is from 0 to 5, preferably from 0 to 4, more preferably from 0 to 3, especially in the case when A is a 6-membered aryl or heteroaryl ring; in the case that A is a 5-membered aryl or heteroaryl ring, n is preferably from 0 to 4; irrespective of the ring size, n is more preferably from 0 to 3, even more preferably from 0 to 2 and in particular from 0 to 1; the remaining carbon atoms or heteroatoms of A not bearing any substituents B bear hydrogen atoms or, if appropriate, no substituents;

B is independently selected from the group consisting of alkyl, alkenyl, alkynyl, substituted alkyl, substituted alkenyl, substituted alkynyl, heteroalkyl, substituted heteroalkyl, heteroalkenyl, substituted heteroalkenyl, heteroalkynyl, substituted heteroalkynyl, cycloalkyl, cycloalkenyl, substituted cycloalkyl, substituted cycloalkenyl, COOR where R is H, alkyl, substituted alkyl, cycloalkyl, substituted cycloalkyl, aryl or substituted aryl, halogen, hydroxyl, alkoxy, aryloxy, carbonyl, amino, amido, thio and phosphine; B is preferably selected independently from $C_{1-6}$-alkyl, $C_{1-6}$-alkenyl, $C_{1-6}$-alkynyl, $C_{3-8}$-cycloalkyl, $C_{3-4}$-cycloalkenyl, COOR where R is H or $C_{1-12}$-alkyl, hydroxyl, alkoxy, aryloxy, amino and amido; B is more preferably independently $C_{1-6}$-alkyl, COOR where R is H or $C_{1-12}$-alkyl, amino, hydroxyl or alkoxy.

The expression "independently" means that when n is 2 or greater, the substituents B may be identical or different radicals from the groups mentioned.

According to the present application, unless stated otherwise, alkyl is understood to mean branched or linear, saturated acyclic hydrocarbon radicals. Examples of suitable alkyl radicals are methyl, ethyl, n-propyl, i-propyl, n-butyl, t-butyl, i-butyl etc. Preference is given to alkyl radicals having from 1 to 50 carbon atoms, more preferably having from 1 to 20 carbon atoms, most preferably having from 1 to 6 carbon atoms and in particular having from 1 to 3 carbon atoms.

In the abovementioned COOR group, R is H or branched or linear alkyl, preferably H or $C_{1-12}$-alkyl. Preferred alkyl groups are $C_{4-10}$-alkyl groups, more preferably $C_{8-10}$-alkyl groups. These may be branched or unbranched and are preferably branched. The alkyl groups having more than three carbon atoms may be isomer mixtures of different alkyl groups having the same carbon number. One example is a $C_9$-alkyl group which may be an isononyl group, i.e. an isomer mixture of different $C_9$-alkyl groups. The same also applies, for example, to a $C_8$-alkyl group. Such isomer mixtures are obtained starting from the alcohols corresponding to the alkyl groups, which are obtained as isomer mixtures owing to their preparation process known to those skilled in the art.

According to the present application, alkenyl is understood to mean branched or unbranched acyclic hydrocarbon radicals which have at least one carbon-carbon double bond. Suitable alkenyl radicals are, for example, 2-propenyl, vinyl, etc. The alkenyl radicals have preferably from 2 to 50 carbon atoms, more preferably from 2 to 20 carbon atoms, most preferably from 2 to 6 carbon atoms and in particular from 2 to 3 carbon atoms. The term alkenyl is also understood to mean those radicals which have either a cis orientation or a trans orientation (alternatively E or Z orientation).

According to the present application, alkynyl is understood to mean branched or unbranched acyclic hydrocarbon radicals which have at least one carbon-carbon triple bond. The alkynyl radicals have preferably from 2 to 50 carbon atoms, more preferably from 2 to 20 carbon atoms, even more preferably from 1 to 6 carbon atoms and in particular from 2 to 3 carbon atoms.

Substituted alkyl, substituted alkenyl and substituted alkynyl are understood to mean alkyl, alkenyl and alkynyl radicals in which one or more hydrogen atoms which are bonded to a carbon atom of these radicals are replaced by another group. Examples of such other groups are heteroatoms, halogen, aryl, substituted aryl, cycloalkyl, cycloalkenyl, substituted cycloalkyl, substituted cycloalkenyl and combinations thereof. Examples of suitable substituted alkyl radicals are benzyl, trifluoromethyl, among others.

The terms heteroalkyl, heteroalkenyl and heteroalkynyl are understood to mean alkyl, alkenyl and alkynyl radicals in which one or more of the carbon atoms in the carbon chain are replaced by a heteroatom selected from N, O and S. The bond between the heteroatom and a further carbon atom may be saturated or optionally unsaturated.

According to the present application, cycloalkyl is understood to mean cyclic nonaromatic hydrocarbon radicals which are composed of a single ring or a plurality of fused rings. Suitable cycloalkyl radicals are, for example, cyclopentyl, cyclohexyl, cyclooctanyl, bicyclooctyl, etc. The cycloalkyl radicals have preferably between 3 and 50 carbon atoms, more preferably between 3 and 20 carbon atoms, even more preferably between 3 and 8 carbon atoms and in particular between 3 and 6 carbon atoms.

According to the present application, cycloalkenyl is understood to mean partly unsaturated, cyclic nonaromatic hydrocarbon radicals which have a single ring or a plurality of fused rings. Suitable cycloalkenyl radicals are, for example, cyclopentenyl, cyclohexenyl, cyclooctenyl, etc. The cycloalkenyl radicals have preferably from 3 to 50 carbon atoms, more preferably from 3 to 20 carbon atoms, even more preferably from 3 to 8 carbon atoms and in particular from 3 to 0.6 carbon atoms.

Substituted cycloalkyl and substituted cycloalkenyl radicals are cycloalkyl and cycloalkenyl radicals in which one or more hydrogen atoms of any carbon atom of the carbon ring may be replaced by another group. Such other groups are, for example, halogen, alkyl, alkenyl, alkynyl, substituted alkyl, substituted alkenyl, substituted alkynyl, aryl, substituted aryl, cycloalkyl, cycloalkenyl, substituted cycloalkyl, substituted cycloalkenyl, an aliphatic heterocyclic radical, a substituted aliphatic heterocyclic radical, heteroaryl, substituted heteroaryl, alkoxy, aryloxy, boryl, phosphino, amino, silyl, thio, seleno and combinations thereof. Examples of substituted cycloalkyl and cycloalkenyl radicals are 4-dimethylaminocyclohexyl, 4,5-dibromocyclohept-4-enyl, among others.

In the context of the present application, aryl is understood to mean aromatic radicals which have a single aromatic ring or a plurality of aromatic rings which are fused, joined via a covalent bond or joined by a suitable unit, for example a methylene or ethylene unit. Such suitable units may also be carbonyl units, as in benzophenol, or oxygen units as in diphenyl ether, or nitrogen units as in diphenylamine. The aromatic ring or the aromatic rings are, for example, phenyl, naphthyl, diphenyl, diphenyl ether, diphenylamine and benzophenone. The aryl radicals have preferably from 6 to 50 carbon atoms, more preferably from 6 to 20 carbon atoms, most preferably from 6 to 8 carbon atoms.

Substituted aryl radicals are aryl radicals in which one or more hydrogen atoms which are bonded to carbon atoms of the aryl radical are replaced by one or more other groups. Suitable other groups are alkyl, alkenyl, alkynyl, substituted alkyl, substituted alkenyl, substituted alkynyl, cycloalkyl, cycloalkenyl, substituted cycloalkyl, substituted cycloalkenyl, heterocyclo, substituted heterocyclo, halogen, and halogen-substituted alkyl (e.g. $CF_3$), hydroxyl, amino, phosphino, alkoxy, thio, and both saturated and unsaturated cyclic hydrocarbons which may be fused to the aromatic ring or to the aromatic rings or be joined by a bond, or be joined to one another via a suitable group. Suitable groups have already been mentioned above.

Heteroaryl radicals are understood to mean those aryl radicals in which one or more of the carbon atoms of the aromatic ring of the aryl radical has/have been replaced by a heteroatom selected from N, O and S.

Substituted heteroaryl radicals are understood to mean those substituted aryl radicals in which one or more of the carbon atoms of the aromatic ring of the substituted aryl radical has/have been replaced by a heteroatom selected from N, O and S.

According to the present application, heterocyclo is understood to mean a saturated, partly unsaturated or unsaturated cyclic radical in which one or more carbon atoms of the radical have been replaced by a heteroatom, for example N, O or S (the term "heterocyclo" also includes the aforementioned heteroaryl radicals). Examples of heterocyclo radicals are piperazinyl, morpholinyl, tetrahydropyranyl, tetrahydrofuranyl, piperidinyl, pyrrolidinyl, oxazolinyl, pyridyl, pyrazyl, pyridazyl, pyrimidyl.

Substituted heterocyclo radicals are those heterocyclo radicals in which one or more hydrogen atoms which are bonded to one of the ring atoms are replaced by another group. Suitable other groups are halogen, alkyl, substituted alkyl, aryl, substituted aryl, heteroaryl, substituted heteroaryl, alkoxy, aryloxy, boryl, phosphino, amino, silyl, thio, seleno and combinations thereof.

Alkoxy radicals are understood to mean radicals of the general formula $—OZ^1$ in which $Z^1$ is selected from alkyl, substituted alkyl, cycloalkyl, substituted cycloalkyl, heterocycloalkyl, substituted heterocycloalkyl, silyl and combinations thereof. Suitable alkoxy radicals are, for example, methoxy, ethoxy, benzyloxy, t-butoxy, etc. The term aryloxy is understood to mean those radicals of the general formula $—OZ^1$ in which $Z^1$ is selected from aryl, substituted aryl, heteroaryl, substituted heteroaryl and combinations thereof. Suitable aryloxy radicals are phenoxy, substituted phenoxy, 2-pyridinoxy, 8-quinolinoxy, among others.

In a preferred embodiment, A is phenyl, n is from 0 to 3 and B is $C_{1-6}$-alkyl, COOR where R is H or $C_{1-12}$-alkyl, amino, hydroxyl or alkoxy. The inventive hydrogenation process is effected preferably in such a way that the phenyl group is hydrogenated fully to the corresponding cyclohexyl group.

Preferred compounds which are hydrogenated in accordance with the invention to their corresponding cyclohexyl derivatives are specified below.

In a preferred embodiment of the hydrogenation process according to the invention, the aromatic hydrocarbon is selected from the group consisting of benzene and alkyl-substituted benzenes such as toluene, ethylbenzene, xylene (o-, m-, p- or isomer mixture) and mesitylene (1, 2, 4 or 1, 3, 5 or isomer mixture). In the process according to the invention, preference is thus given to hydrogenating benzene to cyclohexane and the alkyl-substituted benzenes such as toluene, ethylbenzene, xylene and mesitylene to alkyl-substituted cyclohexanes such as methylcyclohexane, ethylcyclohexane, dimethylcyclohexane and trimethylcyclohexane. It is also possible to hydrogenate any mixtures of the aforementioned aromatic hydrocarbons to mixtures of the corresponding cyclohexanes. For example, it is possible to use any mixtures comprising two or three compounds selected from benzene, toluene and xylene to mixtures comprising two or three compounds selected from cyclohexane, methylcyclohexane and dimethylcyclohexane.

In a further preferred embodiment of the hydrogenation process according to the invention, the aromatic hydrocarbon is selected from the group consisting of phenol, alkyl-substituted phenols such as 4-tert-butylphenol and 4-nonylphenol, bis(p-hydroxyphenyl)methane and bis(p-hydroxyphenyl)dimethylmethane. In the process according to the invention, preference is thus given to hydrogenating phenol to cyclohexanol, the alkyl-substituted phenols such as 4-tert-butylphenol and 4-nonylphenol to alkyl-substituted cyclohexanols such as 4-tert-butylcyclo-hexanol and 4-nonylcyclohexanol, bis(p-hydroxyphenyl)methane to bis(p-hydroxycyclohexyl)methane and bis(p-hydroxyphenyl)dimethylmethane to bis(p-hydroxycyclohexyl)dimethylmethane.

In a further preferred embodiment of the hydrogenation process according to the invention, the aromatic hydrocarbon is selected from the group consisting of aniline, alkyl-substituted aniline, N,N-dialkylaniline, diaminobenzene, bis(p-aminophenyl)methane and bis(p-aminotolyl)methane. In the process according to the invention, preference is thus given to hydrogenating aniline to cyclohexyl-amine, alkyl-substituted aniline to alkyl-substituted cyclohexylamine, N,N-dialkylaniline to N,N-dialkylcyclohexylamine, diaminobenzene to diaminocyclohexane, bis(p-aminophenyl)methane to bis(p-aminocyclohexyl)methane and bis(p-amino-tolyl)methane to bis(p-aminomethylcyclohexyl)methane.

In a further preferred embodiment of the hydrogenation process according to the invention, the aromatic hydrocarbon is selected from the group consisting of aromatic carboxylic acids such as phthalic acid and aromatic carboxylic esters such as $C_{1-12}$-alkyl esters of phthalic acid, where the $C_{1-12}$-alkyl radicals may be linear or branched, for example dimethyl phthalate, di-2-propylheptyl phthalate, di-2-ethylhexyl phthalate, dioctyl phthalate, diisononyl phthalate. In the process according to the invention, preference is thus given to hydrogenating aromatic carboxylic acids such as phthalic acid to cycloaliphatic carboxylic acids such as tetrahydrophthalic acid and aromatic carboxylic esters such as $C_{1-12}$-alkyl esters of phthalic acid to aliphatic carboxylic esters such as $C_{1-12}$-alkyl esters of tetrahydro-phthalic acid, for example dimethyl phthalate to dimethyl cyclohexane-dicarboxylate, di-2-propylheptyl phthalate to di-2-propylheptyl cyclohexane-dicarboxylate, di-2-ethylhexyl phthalate to di-2-ethylhexyl cyclohexanedicarboxylate, dioctyl phthalate to dioctyl cyclohexanedicarboxylate and diisononyl phthalate to diisononyl cyclohexanedicarboxylate.

In a further embodiment, the present application relates to a process for hydrogenating aldehydes to the corresponding alcohols. Preferred aldehydes are mono- and disaccharides such as glucose, lactose and xylose. The mono- and disaccharides are hydrogenated to the corresponding sugar alcohols, for example glucose is hydrogenated to sorbitol, lactose to lactitol and xylose to xylitol.

Suitable mono- and disaccharides and suitable hydrogenation conditions are disclosed, for example, in DE-A 101 28 205, the coated catalyst according to the present invention being used instead of the catalyst disclosed in DE-A 101 28 205.

The hydrogenation process according to the invention is a selective process for hydrogenating organic compounds which comprise hydrogenatable groups, preferably for hydrogenating a carbocyclic aromatic group to the corresponding carbocyclic aliphatic group, with which high yields and space-time yields, [amount of product/(volume of catalyst·time)] (kg/($l_{cat.}$·h)), [amount of product/(reactor volume·time)] (kg/($l_{reactor}$·h)), based on the catalyst used, can be achieved, and in which the catalysts used can be used repeatedly for hydrogenations without workup. In particular, long catalyst lifetimes are achieved in the hydrogenation process according to the invention.

The hydrogenation process according to the invention may be carried out in the liquid phase or in the gas phase. Preference is given to carrying out the hydrogenation process according to the invention in the liquid phase.

The hydrogenation process according to the invention may be carried out in the absence of a solvent or diluent or presence of a solvent or diluent, i.e. it is not essential to carry out the hydrogenation in solution.

The solvent or diluent used may be any suitable solvent or diluent. Useful solvents or diluents are in principle those which are capable of dissolving the organic compound to be hydrogenated to a maximum extent or mix fully with it and which are inert under the hydrogenation conditions, i.e. are not hydrogenated.

Examples of suitable solvents are cyclic and acyclic ethers, for example tetrahydrofuran, dioxane, methyl tert-butyl ether, dimethoxyethane, dimethoxypropane, dimethyldiethylene glycol, aliphatic alcohols such as methanol, ethanol, n- or isopropanol, n-, 2-, iso- or tert-butanol, carboxylic esters such as methyl acetate, ethyl acetate, propyl acetate or butyl acetate, and also aliphatic ether alcohols such as methoxypropanol, and cycloaliphatic compounds such as cyclohexane, methylcyclohexane and dimethylcyclohexane.

The amount of the solvent or diluent used is not restricted in any particular way and can be freely selected depending on the requirement, although preference is given to amounts which lead to a from 3 to 70% by weight solution of the organic compound intended for hydrogenation. The use of a diluent is advantageous in order to prevent strong exothermicity in the hydrogenation process. Excessive exothermicity can lead to deactivation of the catalyst and is therefore undesired. Careful temperature control is therefore advisable in the hydrogenation process according to the invention. Suitable hydrogenation temperatures are specified below.

When a solvent is used in the process according to the invention, particular preference is given to using the product formed in the hydrogenation, i.e. preferably the particular cycloaliphatic(s), if appropriate in addition to other solvents or diluents. In any case, a portion of the product formed in the process can be added to the aromatic yet to be hydrogenated. In the hydrogenation of benzene, cyclohexane is thus used as a solvent in a particularly preferred embodiment. In the hydrogenation of phthalates, preference is given to using the corresponding cyclohexanedicarboxylic dialkyl esters as solvents.

Based on the weight of the organic compound intended for hydrogenation, preference is given to adding from 1 to 30 times, more preferably from 5 to 20 times, in particular from 5 to 10 times the amount of product as the solvent or diluent. In particular, the present invention relates to a hydrogenation of the type in question here, in which benzene is hydrogenated to cyclohexane in the presence of the inventive catalyst.

The actual hydrogenation is effected typically in analogy to the known hydrogenation processes for hydrogenating organic compounds which have hydrogenatable groups, preferably for hydrogenating a carbocyclic aromatic group to the corresponding carbocyclic aliphatic group, as are described in the prior art cited at the outset. To this end, the organic compound as a liquid phase or gas phase, preferably as a liquid phase, is contacted with the catalyst in the presence of hydrogen. The liquid phase can be passed over a fluidized catalyst bed (fluidized bed mode) or a fixed catalyst bed (fixed bed mode).

The hydrogenation may be configured either continuously or batchwise, preference being given to the continuous process performance. Preference is given to carrying out the process according to the invention in trickle reactors or in flooded mode by the fixed bed mode. The hydrogen may be passed over the catalyst either in cocurrent with the solution of the reactant to be hydrogenated or in countercurrent.

Suitable apparatus for performing a hydrogenation by hydrogenation over a fluidized catalyst bed and over a fixed catalyst bed are known from the prior art, for example from Ullmanns Enzyklopädie der Technischen Chemie, 4$^{th}$ edition, volume 13, p. 135 ff., and also from P. N. Rylander, "Hydrogenation and Dehydrogenation" in Ullmann's Encyclopedia of Industrial Chemistry, 5$^{th}$ ed. on CD-ROM.

The inventive hydrogenation may be performed either at standard hydrogen pressure or at elevated hydrogen pressure, for example at an absolute hydrogen pressure of at least 1.1 bar, preferably at least 2 bar. In general, the absolute hydrogen pressure will not exceed a value of 325 bar and preferably 300 bar. More preferably, the absolute hydrogen pressure is in the range from 1.1 to 300 bar, most preferably in the range from 5 to 40 bar. The hydrogenation of benzene is effected, for example, at a hydrogen pressure of generally $\leq$50 bar, preferably from 10 bar to 45 bar, more preferably from 15 to 40 bar.

The reaction temperatures in the process according to the invention are generally at least 30° C. and will frequently not exceed a value of 250° C. Preference is given to performing the hydrogenation process at temperatures in the range from 50 to 200° C., more preferably from 70 to 180° C. and most preferably in the range from 80 to 160° C. The hydrogenation of benzene is effected, for example, at temperatures in the range from generally from 75° C. to 170° C., preferably from 80° C. to 160° C.

Useful reaction gases in addition to hydrogen are also hydrogenous gases which do not comprise any catalyst poisons such as carbon monoxide or sulfur-containing gases such as $H_2S$ or COS, for example mixtures of hydrogen with inert gases such as nitrogen or reformer offgases which typically still comprise volatile hydrocarbons. Preference is given to using pure hydrogen (purity $\geq$99.9% by volume, particularly $\geq$99.95% by volume, in particular $\geq$99.99% by volume).

Owing to the high catalyst activity, comparatively small amounts of catalyst are required based on the reactant used. For instance, in the batchwise suspension mode, preferably less than 5 mol %, for example from 0.2 mol % to 2 mol %, of active metal will be used based on 1 mole of reactant. In continuous configuration of the hydrogenation process, the reactant to be hydrogenated will typically be conducted over the catalyst in an amount of from 0.05 to 3 kg/(l(catalyst)·h), in particular from 0.15 to 2 kg/(l(catalyst)·h).

It will be appreciated that the catalysts used in this process, in the event of declining activity, can be regenerated by the methods which are customary for noble metal catalysts such as ruthenium catalysts and are known to those skilled in the art. Mention should be made here, for example, of the treatment of the catalyst with oxygen as described in BE 0.882 279, the treatment with dilute, halogen-free mineral acids as described in U.S. Pat. No. 4,072,628, or the treatment with hydrogen peroxide, for example in the form of aqueous solutions having a content of from 0.1 to 35% by weight, or the treatment with other oxidizing substances, preferably in the form of halogen-free solutions. Typically, the catalyst will be rinsed with a solvent, for example water, after being reactivated and before being used again.

The organic compounds which comprise hydrogenatable groups and are used in the hydrogenation process according to the invention (preferred compounds are mentioned above) have, in a preferred embodiment of the process according to the invention, a sulfur content of generally $\leq$2 mg/kg, preferably $\leq$1 mg/kg, more preferably $\leq$0.5 mg/kg, even more preferably $\leq$0.2 mg/kg and in particular $\leq$0.1 mg/kg. The method of determining the sulfur content is mentioned below. A sulfur content of $\leq$0.1 mg/kg means that no sulfur is detected in the feedstock, for example benzene, with the analysis method specified below.

In the case of the preferred hydrogenation of carbocyclic aromatic groups to the corresponding carbocyclic aliphatic groups, the hydrogenation process according to the invention preferably features the full hydrogenation of the aromatic rings of the organic compounds used with carbocyclic aromatic groups, the degree of hydrogenation being generally >98%, preferably >99%, more preferably >99.5%, even more preferably >99.9%, in particular >99.99% and especially >99.995%.

The degree of hydrogenation is determined by gas chromatography. In the case of hydrogenation of dicarboxylic acids and dicarboxylic esters, especially phthalates, the degree of hydrogenation is determined by means of UV/VIS spectrometry.

A particularly preferred embodiment of the hydrogenation process according to the invention relates to the hydrogenation of benzene to cyclohexane. The hydrogenation process according to the invention will therefore be described in detail below using the example of benzene hydrogenation.

The hydrogenation of benzene is effected generally in the liquid phase. It may be performed continuously or batchwise, preference being given to continuous performance.

The benzene hydrogenation according to the invention is effected generally at a temperature of from 75° C. to 170° C., preferably from 80° C. to 160° C. The pressure is generally ≦50 bar, preferably from 10 bar to 45 bar, more preferably from 15 bar to 40 bar, most preferably from 18 to 38 bar.

The benzene used in the hydrogenation process according to the invention has, in a preferred embodiment of the process according to the invention, a sulfur content of generally ≦2 mg/kg, preferably ≦1 mg/kg, more preferably ≦0.5 mg/kg, even more preferably ≦0.2 mg/kg and in particular ≦0.1 mg/kg. The method of determining the sulfur content is mentioned below. A sulfur content of ≦0.1 mg/kg means that no sulfur can be detected in the benzene with the analysis method specified below.

The hydrogenation can be performed generally in the fluidized bed or fixed bed mode, preference being given to performance in the fixed bed mode. Particular preference is given to performing the hydrogenation process according to the invention with liquid circulation, in which case the heat of hydrogenation can be removed by means of a heat exchanger and utilized. The feed/circulation ratio in the case of performance of the hydrogenation process according to the invention with liquid circulation is from generally 1:5 to 1:40, preferably from 1:10 to 1:30.

In order to achieve full conversion, postreaction of the hydrogenation effluent may be effected. To this end, the hydrogenation effluent may be passed through a downstream reactor after the hydrogenation process according to the invention in the gas phase or in the liquid phase in straight pass. In the case of liquid phase hydrogenation, the reactor may be operated in trickle mode or operated in flooded mode. The reactor is charged with the inventive catalyst or with another catalyst known to those skilled in the art.

With the aid of the process according to the invention, it is thus possible to obtain hydrogenated products which comprise very small residual contents, if any, of the starting materials to be hydrogenated.

The present application further provides for the use of the inventive coated catalyst in a process for hydrogenating an organic compound which comprises hydrogenatable groups, preferably for hydrogenating a carbocyclic aromatic group to the corresponding carbocyclic aliphatic group or for hydrogenating aldehydes to the corresponding alcohols, more preferably for hydrogenating a carbocyclic aromatic group to the corresponding carbocyclic aliphatic group. Suitable catalysts, process conditions and compounds to be hydrogenated are specified above.

The examples which follow provide additional illustration of the invention.

EXAMPLES

Catalysts

Catalyst A—Ru/Al$_2$O$_3$ (Comparative)

Catalyst H 220 H/D 0.5% (product designation) from Degussa; 0.47% by weight of ruthenium on an Al$_2$O$_3$ support material (batch number: 20014273).

Catalyst B—Ru/SiO$_2$ (Comparative)

Catalyst B is prepared according to the general preparation example (Example 29) in DE-A 101 28 242:

Impregnation of ruthenium(III) nitrosylnitrate on SiO$_2$ (the amount of ruthenium was selected such that a similar amount of ruthenium is present per reactor volume to catalyst A, i.e. 0.7% by weight of Ru).

Feedstocks:

Ruthenium(III) nitrosylnitrates from Umicore (formerly OMG) No. 68 2575 1620 (10.85% by weight of Ru; No. 2419/01-02);

SiO$_2$: BASF—D11-10 (3 mm extrudates, batch No. 98/23431, water absorption 8.76 ml/10 g, BET 118 m$^2$/g).

Catalyst B has a slight ruthenium gradient: in the interior, the ruthenium concentration is approx. 50% of the ruthenium concentration in the coating (determined with SEM, EDXS, over the cross section of the catalyst extrudate).

Catalyst C—Ru/Al$_2$O$_3$ (comparative)

75 g of Al$_2$O$_3$ (from Norpro (02/R00690), thermally treated at 1085° C. for 6 h; BET 55.5 m$^2$/g; water absorption of 0.66 ml/g) is dissolved with a ruthenium chloride solution (0.88 g of ruthenium(III) chloride hydrate from Aldrich, No. 20, 622-9 Lot 10313A1-070) in 49.5 ml of demineralized water and spray impregnated at room temperature. The impregnated support is dried at 120° C. under motion. The reduction is effected at 300° C. for 4 h in a hydrogen atmosphere (50 l (STP)/h of H$_2$-10 l (STP)/h of N$_2$). After the reduction, passivation is effected at room temperature (starting amount of air: 3% by volume of air in N$_2$, the amount of air being increased gradually in the course of the passivation). The catalyst comprises 0.43% by weight of ruthenium.

Catalyst D—Ru/SiO$_2$; Catalyst E—Ru/SiO$_2$ (Inventive)

Feedstocks;

SiO$_2$ support D11-10 (BASF); 3 mm extrudates (No. 98/23431, water absorption 8.76 ml/10 g, BET 118 m$^2$/g)

Ru compound: ruthenium(III) acetate dissolved in acetic acid (from Umicore, 5.22% by weight of Ru, product number 68 1875 2605, order No. 240299)

6.8 g of ruthenium(III) acetate solution is made up to 83 ml with demineralized water and distributed over 100 g of the D11-10 support, dried at 120-130° C. (under motion), reduced at 300° C. for 2 h (50 l (STP)/h of H$_2$-10 l (STP)/h of N$_2$); and passivated at room temperature (6% by volume of air in N$_2$).

Catalyst D comprises 0.35% by weight of Ru,

Catalyst E has 0.34% by weight of Ru.

Catalyst F—Ru/SiO$_2$ (Inventive)

Catalyst F is prepared similarly to catalysts D and E, but on 1.5 mm extrudates (support number 84084, the water absorption of this batch is 9.5 ml/10 g, BET 167 m$^2$/g). Impregnation is again effected at 95-98% by weight water absorption. The finished catalyst F comprises 0.3.6% by weight of Ru.

Catalyst G—Ru/SiO$_2$ (Inventive)

50 kg of the SiO$_2$ support (D11-10 (BASF); 3 mm of extrudates (No. 04/19668), water absorption of 0.95 ml/g, BET 135 m$^2$/g) are initially charged in an impregnation drum and impregnated at 96-98% by weight water absorption. The aqueous impregnation solution comprises 0.176 kg of Ru as Ru acetate (from Umicore, 4.34% by weight of Ru, batch 0255). The impregnated catalyst is dried at an oven temperature of 145° C. without motion down to a residue moisture content of approx. 1%. The reduction is effected in hydrogen with motion (approx. 75% H$_2$ in N$_2$, N$_2$ being employed as the purge stream; 1.5 m$^3$ (STP)/h of H$_2$-0.5 m$^3$ (STP)/h of N$_2$) in a moving bed at 300° C. and a residence time of 90 minutes (1-2 h). The passivation is effected in dilute air (air in N$_2$). The air addition is controlled such that the temperature of the catalyst remains below 30-35° C.

The finished catalyst G comprises 0.31-0.32% by weight of Ru.

Catalyst H—Ru/SiO$_2$ (Inventive)

Feedstocks:

SiO$_2$ support: 50 g of Davicat Grade 57 (Davison-Grace, spall, lot 2169, WA 1.01 ml/g, BET 340 m$^2$/g);

Ru solution: 3.36 g of ruthenium(III) acetate (from Umicore, 5.22% by weight of Ru; product number 68 1875 2605; order No. 240299)

The Ru solution is made up to 50 ml with demineralized water. This solution is distributed over the support and dried at 120° C. in a drying cabinet, reduced at 300° C. for 2 h (50 l (STP)/h of H$_2$-10 l (STP)/h of N$_2$); and passivated at room temperature, 6% by volume of air in N$_2$.

The catalyst comprises 0.33% by weight of Ru.

The Inventive Catalyst G is Described in Detail Below:

Support:

The support used is the BASF SiO$_2$ support D11-10 (3 mm extrudate):

D11-10 is a commercial product from BASF and can be purchased.

The porosity of the shaped body: 0.95 ml/g (water absorption determination, BASF—CAK/Q method 1021 consists in saturating the support with water—supernatant solution—and determining the amount of water absorbed after the water has dripped off. 1 ml of water=1 g of water).

The bulk density of the shaped body is: 467 g/l (up to diameter of the shaped body of 6 mm) (BASF-CAK/Q method 1001).

Catalyst G:

The preparation process is described above.

Ruthenium content: 0.31-0.32% by weight

Method description: from 0.03 to 0.05 grain of the sample is mixed with 5 g of sodium peroxide in an alsint crucible and heated slowly on a hotplate. Subsequently, the bulk flux mixture is first melted over an open flame and then heated over a blowtorch flame until it glows red. The fusion has ended as soon as a clear melt has been attained.

The cooled melt cake is dissolved in 80 ml of water, and the solution is heated to boiling (destruction of H$_2$O$_2$) and then, after cooling, admixed with 50 ml of 21% by weight hydrochloric acid.

Afterward, the solution is made up to a volume of 250 ml with water.

Analysis: this sample solution is analyzed by ICP-MS for isotope Ru 99.

Ru dispersity: 90-95% (by CO sorption, assumed stoichiometric factor: 1; sample preparation: reduction of the sample at 200° C. for 30 min with hydrogen and subsequently flushed with helium at 200° C. for 30 min—analysis of the metal surface with pulses of the gas to be adsorbed in an inert gas stream (CO) up to saturation of chemisorption at 35° C. Saturation has been attained when no further CO is adsorbed, i.e. the areas of 3 to 4 successive peaks (detector signal) are constant and similar to the peak of an unabsorbed pulse. Pulse volume is determined precisely to 1%, pressure and temperature of the gas have to be checked). (Method: see DIN 66136)

Surface analysis—pore distribution (N$_2$ sorption to DIN 66131/DIN 66134 or Hg porosimetry to DIN 66133)

N$_2$ sorption: BET 130-131 m$^2$/g (DIN 66131)

Mean pore diameter 26-27 nm (DIN 66134)

Pore volume: 0.84-0.89 ml/g

Hg porosimetry (DIN 66133)

BET 119-122 m$^2$/g

Mean pore diameter (4V/A) 28-29 nm

Pore volume: 0.86-0.87 ml/g

TEM:

The reduced catalyst G comprises at least partly crystalline ruthenium in the outermost zone (extrudate surface). In the support, ruthenium occurs in individual particles 1-10 nm (in places >5 nm): usually 1-5 nm. The size of the particles decreases from the outside inward.

Ruthenium particles are seen up to a depth of 30-50 micrometers below the extrudate surface. In this coating, ruthenium is present at least partly in crystalline form (SAD: selected area diffraction). The main portion of the ruthenium is thus in this coating (>90% within the first 50 μm).

Hydrogenations

General Experimental Description (GED) for Experiments in the Pressure Vessel:

A heatable 1.2 l pressure vessel (internal diameter 90 mm, vessel height: 200 mm, material 1.4580 or 2.4610) with 4-beam sparging stirrer, baffles and an internal riser for sampling or for charging and emptying the pressure vessel is charged with the particular amount (volume or mass) of the catalyst used in a "catalyst basket" (material 2.4610).

The pressure vessel is sealed for pressure testing and charged with 50 bar of nitrogen. Afterward, the pressure vessel is decompressed, evacuated with a vacuum pump and isolated from the vacuum pump, and feedstock or the feedstock solution is sucked into the vessel via the riser.

To remove residue amounts of oxygen, the vessel is charged at room temperature successively twice with 10-15 bar each time of nitrogen and twice with 10-15 bar each time of hydrogen and decompressed.

The stirrer is switched on, a stirrer speed of 1000 rpm is established and the reaction solution is heated to reaction temperature. The target temperature is attained after 15 minutes at the latest. Hydrogen is injected up to the particular target pressure within 5 minutes. The hydrogen consumption is determined by means of a Büchi unit and the pressure is kept constant at the particular target pressure.

The riser is used at regular intervals to take preliminary samples (to flush the riser) and samples of the reaction mixture for monitoring the progress of the reaction.

After the appropriate reaction time, the heater is switched off, the pressure vessel is cooled to 25° C., the elevated pressure is released slowly and the reaction mixture is emptied via the riser with slightly elevated pressure.

The hydrogen used had a purity of at least 99.9-99.99% by volume (based on dry gas). Secondary constituents are carbon monoxide (max. 10 ppm by volume), nitrogen (max. 100 ppm by volume), argon (max. 100 ppm by volume) and water (max. 400 ppm by volume).

General Experimental Description for Series Experiments (GES) in the Pressure Vessel The procedure is according to the general experimental description (GED), except that the catalyst used remains in the catalyst basket after the end of the experiment. After evacuation of the pressure vessel with the vacuum pump, the vessel is isolated from the vacuum pump and new feedstock or the feedstock solution is sucked into the vessel via the riser.

Hydrogenation of Benzene to Cyclohexane

Benzene (BASF) with a purity of >99.90% by weight and a total sulfur content of <0.2 mg/kg is used (the method of sulfur determination is specified below). The cyclohexane used (BASF) has a purity of >99.95% by weight and a total sulfur content of <0.2 mg/kg (the method of sulfur determination is specified below).

Hydrogenation Examples for Catalyst Comparison

The experiments are carried out in such a way that the same amount of ruthenium is used in each case. The feedstock used in each case is 750 ml of a 5% by weight solution of benzene in cyclohexane.

| Procedure: | According to "GES" method |
|---|---|
| Pressure: | 32 bar |
| Temperature: | 100° C. |
| Catalysts used: | 20.6 g of catalyst E (inventive) (0.34% Ru/SiO₂ D11-10 support, 3 mm) |
| | 19.4 g of catalyst F (inventive) (0.36% Ru/SiO₂ D11-10 support, 1.5 mm) |
| | 16.3 g of catalyst C (comparative) (0.43% Ru/Al₂O₃ Norpro support) |
| | 21.2 g of catalyst H (inventive) (0.33% Ru on Davicat G57, Grace support) |
| | 14.9 g of catalyst A (comparative) (0.5%) (0.47% Ru/Al₂O₃, Degussa catalyst, batch number 20014273) |
| Analysis: | GC analysis in GC area % (the procedure is specified below) |

The particular catalysts are used repeatedly in four successive experiments. Samples are taken after reaction times of 20, 40, 60, 90, 120, 180 and 240 minutes.

Evaluation:

The tables which follow list the decrease in the benzene content over time. The mean values of the results of the four experiments in each case and also the maximum positive and negative deviation from the mean for the particular samples are evaluated:

Hydrogenation Example 1

Catalyst E (inventive) (0.34% Ru/SiO₂ D11-10 support)

| Reaction time [mm] | Benzene content (mean of the 4 experiments, GC area %) | Maximum negative deviation from the mean | Maximum positive deviation from the mean |
|---|---|---|---|
| (0, Starting solution) | 5.288% | 0 | 0 |
| 20 | 0.302% | −0.106 | +0.143 |
| 40 | 0.004% | 0 | +0.001 |
| 60 | 0% | 0 | 0 |
| 90 | 0% | 0 | 0 |
| 120 | 0% | 0 | 0 |
| 180 | 0% | 0 | 0 |
| 240 | 0% | 0 | 0 |

Hydrogenation Example 2

Catalyst F (inventive) (0.36% Ru/SiO₂ D11-10 support)

| Reaction time [min] | Benzene content (mean of the 4 experiments, GC area %) | Maximum negative deviation from the mean | Maximum positive deviation from the mean |
|---|---|---|---|
| (0, Starting solution) | 5.308% | −0.021 | +0.010 |
| 20 | 0.013% | −0.009 | +0.016 |
| 40 | 0% | 0 | 0 |
| 60 | 0% | 0 | 0 |
| 90 | 0% | 0 | 0 |
| 120 | 0% | 0 | 0 |
| 180 | 0% | 0 | 0 |
| 240 | 0% | 0 | 0 |

Hydrogenation Example 3

Catalyst C (comparative) (0.43% Ru/Al₂O₃ Norpro support)

| Reaction time [min] | Benzene content (mean of the 4 experiments, GC area %) | Maximum negative deviation from the mean | Maximum positive deviation from the mean |
|---|---|---|---|
| (0, Starting solution) | 5.245% | 0 | 0 |
| 20 | 2.640% | −0.559 | +0.632 |
| 40 | 0.448% | −0.030 | +0.040 |
| 60 | 0.058% | −0.012 | +0.015 |
| 90 | 0.002% | −0.002 | +0.001 |
| 120 | 0% | 0 | 0 |
| 180 | 0% | 0 | 0 |
| 240 | 0% | 0 | 0 |

Hydrogenation Example 4

Catalyst H (inventive) (0.33% Ru on Davicat G57, Grace support)

| Reaction time [min] | Benzene content (mean of the 4 experiments, GC area %) | Maximum negative deviation from the mean | Maximum positive deviation from the mean |
|---|---|---|---|
| (0, Starting solution) | 5.245% | 0 | 0 |
| 20 | 0.194% | −0.113 | +0.143 |
| 40 | 0.003% | −0.003 | +0.004 |
| 60 | 0% | 0 | 0 |
| 90 | 0% | 0 | 0 |
| 120 | 0% | 0 | 0 |
| 180 | 0% | 0 | 0 |
| 240 | 0% | 0 | 0 |

Hydrogenation Example 5

Catalyst A (inventive) (0.47% Ru/Al₂O₃)

| Reaction time [min] | Benzene content (mean of the 4 experiments, GC area %) | Maximum negative deviation from the mean | Maximum positive deviation from the mean |
|---|---|---|---|
| (0, Starting solution) | 5.166% | 0 | 0 |
| 20 | 3.219% | −0.426 | +0.301 |
| 40 | 2.226% | −0.686 | +0.758 |
| 60 | 1.002% | −0.428 | +0.544 |
| 90 | 0.346% | −0.303 | +0.613 |
| 120 | 0.011% | −0.011 | +0.024 |
| 180 | 0.001% | −0.001 | +0.003 |
| 240 | 0% | 0 | 0 |

Result:

The results demonstrate that, when the same amount of ruthenium is used, catalysts H (0.33% Ru on Davicat G57, Grace support), E (0.34% Ru/SiO₂ D11-10 support, 3 mm extrudate) and F (0.36% Ru/SiO₂ D11-10 support, 1.5 mm extrudate) have the highest activity in the comparison.

Owing to the high activity of catalysts E and F, comparative experiments are performed with a smaller total amount of ruthenium. The feedstock used is 750 ml of a 5% by weight solution of benzene in cyclohexane.

| Procedure: | According to "GES" method |
|---|---|
| Pressure: | 32 bar |
| Temperature: | 100° C. |
| Catalysts used: | 6.9 g of catalyst E (0.34% Ru/SiO₂ D11-10 support, 3 mm) |
| | 6.5 g of catalyst F (0.36% Ru/SiO₂ D11-10 support, 1.5 mm) |
| Analysis: | GC analysis in GC area % (the procedure is specified below) |

The particular catalysts are used repeatedly in four successive experiments. Samples are taken after reaction times of 20, 40, 60, 90 and 120 minutes.

Evaluation:

The tables which follow list the decrease in the benzene content over time. The mean values of the results of the four experiments in each case and also the maximum positive and negative deviation from the mean for the particular samples are evaluated:

Hydrogenated Experiment 6

Catalyst E (inventive) (0.34% Ru/SiO₂ D11-10 support)

| Reaction time [min] | Benzene content (mean of the 4 experiments, GC area %) | Maximum negative deviation from the mean | Maximum positive deviation from the mean |
|---|---|---|---|
| (0, Starting solution) | 5.288% | 0 | 0 |
| 20 | 3.239% | −0.511 | +0.193 |
| 40 | 1.467% | −0.558 | +0.492 |
| 60 | 0.656% | −0.242 | +0.283 |
| 90 | 0.190% | −0.190 | +0.455 |
| 120 | 0.008% | −0.008 | +0.017 |

Hydrogenated Experiment 7

Catalyst F (inventive) (0.36% Ru/SiO₂ D11-10 support)

| Reaction time [min] | Benzene content (mean of the 4 experiments, GC area %) | Maximum negative deviation from the mean | Maximum positive deviation from the mean |
|---|---|---|---|
| (0, Starting solution) | 5.314% | −0.004 | +0.018 |
| 20 | 1.681% | −0.371 | +0.614 |
| 40 | 0.131% | 0-097 | +0.208 |
| 60 | 0.004% | −0.002 | +0.007 |
| 90 | 0% | 0 | 0 |
| 120 | 0% | 0 | 0 |

Owing to the smaller particle diameter and an associated higher accessibility of the catalytically active sites (larger external surface area), catalyst F is the more active of the two catalysts in direct comparison to catalyst E with approximately equal ruthenium content.

In addition, various ruthenium catalysts based on SiO₂ (D11-10 support) with coating structure (catalyst G, inventive) and without coating structure (catalyst B, comparative) were tested in comparison (hydrogenation examples 8-11):

Catalyst B (0.70% Ru/SiO₂ D11-10 support) at 20 and 32 bar at 100° C.;

Catalyst G (0.32% Ru/SiO₂ D11-10 support) at 20 and 32 bar at 100° C.

The same volume of the catalysts is used in each case. The feedstock used is in each case 750 ml of a 5% by weight solution of benzene in cyclohexane.

Hydrogenation Example 8

Hydrogenation of 750 ml of a 5% solution of benzene in cyclohexane

| Procedure: | According to "GES" method |
|---|---|
| Pressure: | 20 bar |
| Temperature: | 100° C. |
| Catalyst: | Catalyst G (inventive) (0.32% Ru/SiO₂ on D11-10 support, 3 mm) |
| Amount of catalyst used: | 9.0 g (approx. 22 ml) |
| Analysis: | GC analysis in GC area % (the procedure is specified below) |

The catalyst is used repeatedly in five successive experiments. Samples are taken after reaction times of 10, 20, 30, 40, 60, 90, 120 and 180 minutes.

Evaluation:

The table which follows lists the decrease in the benzene content over time. The mean values of the results of the five experiments and also the maximum positive and negative deviation from the mean for the particular samples are evaluated:

| Reaction time [min] | Benzene content (mean of the 5 experiments, GC area %) | Maximum negative deviation from the mean | Maximum positive deviation from the mean |
|---|---|---|---|
| (0, Starting solution) | 5.394 | −0.015 | +0.005 |
| 10 | 3.728 | −0.520 | +0.343 |
| 20 | 2.647 | −0.669 | +0.367 |
| 30 | 1.655 | −0.718 | +0.509 |
| 40 | 0.943 | −0.851 | +0.562 |
| 60 | 0.100 | −0.097 | +0.159 |
| 90 | 0.002 | −0.002 | +0.003 |
| 120 | 0 | 0 | 0 |
| 180 | 0 | 0 | 0 |

Hydrogenation Example 9

Hydrogenation of 750 ml of a 5% solution of benzene in cyclohexane

| Procedure: | According to "GES" method |
|---|---|
| Pressure: | 32 bar |
| Temperature: | 100° C. |
| Catalyst: | Catalyst G (inventive) (0.32% Ru/SiO₂ on D11-10 support, 3 mm) |
| Amount of catalyst used: | 9.0 g (approx. 22 ml) |
| Analysis: | GC analysis in GC area % (the procedure is specified below) |

The catalyst is used repeatedly for five successive experiments. Samples are taken after reaction times of 10, 20, 30, 40, 60, 90, 120 and 180 minutes.

Evaluation:

The table which follows lists the decrease in the benzene content over time. The mean values of the results of the five experiments and also the maximum positive and negative deviation from the mean for the particular samples are evaluated:

| Reaction time [min] | Benzene content (mean of the 5 experiments, GC area %) | Maximum negative deviation from the mean | Maximum positive deviation from the mean |
|---|---|---|---|
| (0, Starting solution) | 5.394% | 0 | 0 |
| 10 | 3.005% | −0.529 | +1.074 |
| 20 | 1.263% | −0.713 | +1.176 |
| 30 | 0.399% | −0.321 | +0.503 |
| 40 | 0.080% | −0.072 | +0.164 |
| 60 | 0.002% | −0.001 | +0.001 |
| 90 | 0.001% | −0.000 | +0.001 |
| 120 | 0.001% | −0.001 | +0.001 |
| 180 | 0% | 0 | 0 |

Hydrogenation Example 10

Hydrogenation of 750 ml of a 5% solution of benzene in cyclohexane

| Procedure: | According to "GES" method |
|---|---|
| Pressure: | 20 bar |
| Temperature: | 100° C. |
| Catalyst: | Catalyst B (comparative) (0.70% Ru/SiO$_2$ D11-10 support, 3 mm) |
| Amount of catalyst used: | 10.0 g (approx. 22 ml) |
| Analysis: | GC analysis in GC area % (the procedure is specified below) |

The catalyst is used repeatedly for five successive experiments. Samples are taken after reaction times of 10, 20, 30, 40, 60, 90, 120 and 180 minutes.

Evaluation:

The table which follows lists the decrease in the benzene content over time. The mean values of the results of the five experiments and also the maximum positive and negative deviation from the mean for the particular samples are evaluated:

| Reaction time [min] | Benzene content (mean of the 5 experiments, GC area %) | Maximum negative deviation from the mean | Maximum positive deviation from the mean |
|---|---|---|---|
| (0, Starting solution) | 5.365% | −0.071 | +0.034 |
| 10 | 4.189% | −0.252 | +0.211 |
| 20 | 3.183% | −0.251 | +0.234 |
| 30 | 2.252% | −0.263 | +0.293 |
| 40 | 1.434% | −0.318 | +0.330 |
| 60 | 0.327% | −0.228 | +0.268 |
| 90 | 0.008% | −0.008 | +0.014 |
| 120 | 0% | 0 | 0 |
| 180 | 0% | 0 | 0 |

Hydrogenation Example 11

Hydrogenation of a 5% solution of benzene in cyclohexane

| Procedure: | According to "GES" method |
|---|---|
| Pressure: | 32 bar |
| Temperature: | 100° C. |
| Catalyst: | Catalyst B (comparative) (0.70% Ru/SiO$_2$ D11-10 support, 3 mm) |
| Amount of catalyst used: | 10.0 g (approx. 22 ml) |
| Analysis: | GC analysis in GC area % (the procedure is specified below) |

The catalyst is used repeatedly for five successive experiments. Samples are taken after reaction times of 10, 20, 30, 40, 60, 90, 120 and 180 minutes.

Evaluation:

The table which follows lists the decrease in the benzene content over time. The mean values of the results of the five experiments and also the maximum positive and negative deviation from the mean for the particular samples are evaluated:

| Reaction time [min] | Benzene content (mean of the 5 experiments, GC area %) | Maximum negative deviation from the mean | Maximum positive deviation from the mean |
|---|---|---|---|
| (0, Starting solution) | 5.379% | −0.013 | +0.019 |
| 10 | 3.309% | −0.800 | +0.532 |
| 20 | 2.330% | −0.954 | +0.724 |
| 30 | 1.401% | −0.485 | +0.455 |
| 40 | 0.706% | −0.620 | +0.539 |
| 60 | 0.161% | −0.158 | +0.194 |
| 90 | 0.009% | −0.009 | +0.012 |
| 120 | 0% | 0 | +0.001 |
| 180 | 0% | 0 | 0 |

Result:

The results of the four hydrogenation examples demonstrate that, when the same catalyst volume is used, catalyst G (inventive) (0.32% Ru D11-10, 3 mm) with coating structure, in spite of the smaller total content of ruthenium, is the more active catalyst in comparison to catalyst B (comparative) (0.70% Ru D11-10, 3 mm). This is true both at a hydrogen pressure of 20 bar (comparison of hydrogenation examples 8 and 10) and at a hydrogen pressure of 32 bar (comparison of hydrogenation examples 9 and 11).

A comparison of experiments with approximately equal ruthenium content is also carried out.

The experiments of hydrogenation examples 8 and 9
Catalyst G (inventive) (0.32% Ru D11-10, 3 mm) at 20 bar and 100° C. (hydrogenation example 8, approx. 29 mg of ruthenium)
Catalyst G (inventive) (0.32% Ru D11-10, 3 mm) at. 32 bar and 100° C. (hydrogenation example 9, approx. 29 mg of ruthenium)
are compared with two experiments of catalyst B (comparative) (0.70% Ru D11-10, 3 mm):
Catalyst B (0.70% Ru D11-10, 3 mm) at 32 bar and 100° C. (hydrogenation example 12, approx. 31 mg of ruthenium)
Catalyst B (0.70% Ru D11-10, 3 mm) at 32 bar and 100° C. (hydrogenation example 13, approx. 31 mg of ruthenium).

The feedstock used is 750 ml of a 5% by weight solution of benzene in cyclohexane.

Hydrogenation Example 12

Hydrogenation of 750 ml of a 5% solution of benzene in cyclohexane

| | |
|---|---|
| Procedure: | According to "GES" method |
| Pressure: | 20 bar |
| Temperature: | 100° C. |
| Catalyst: | Catalyst B (comparative) (0.70% Ru/SiO₂ D11-10 support, 3 mm) |
| Amount of catalyst used: | 4.4 g |
| Analysis: | GC analysis in GC area % (the procedure is specified below) |

The catalyst is used repeatedly for five successive experiments. Samples are taken after reaction times of 10, 20, 30, 40, 60, 90, 120, 180 and 240 minutes.

Evaluation:

The table which follows lists the decrease in the benzene content over time. The mean values of the results of the five experiments and also the maximum positive and negative deviation from the mean for the particular samples are evaluated:

| Reaction time [min] | Benzene content (mean of the 5 experiments, GC area %) | Maximum negative deviation from the mean | Maximum positive deviation from the mean |
|---|---|---|---|
| (0, Starting solution) | 5.344% | −0.050 | +0.033 |
| 10 | 4.710% | −0.044 | +0.056 |
| 20 | 4.255% | −0.053 | +0.049 |
| 30 | 3.823% | −0.126 | +0.131 |
| 40 | 3.386% | −0.287 | +0.194 |
| 60 | 2.737% | −0.213 | +0.132 |
| 90 | 1.607% | −0.214 | +0.379 |
| 120 | 0.710% | −0.217 | +0.433 |
| 180 | 0.043% | −0.042 | +0.112 |
| 240 | 0.001% | −0.001 | +0.004 |

Hydrogenation Example 13

Hydrogenation of a 5% solution of benzene in cyclohexane

| | |
|---|---|
| Procedure: | According to "GES" method |
| Pressure: | 32 bar |
| Temperature: | 100° C. |
| Catalyst: | Catalyst B (comparative) (0.70% Ru/SiO₂ D11-10 support, 3 mm) |
| Amount of catalyst used: | 4.4 g |
| Analysis: | GC analysis in GC area % (the procedure is specified below) |

The catalyst is used repeatedly for five successive experiments. Samples are taken after reaction times of 10, 20, 30, 40, 60, 90, 120 and 180 minutes.

Evaluation:

The table which follows lists the decrease in the benzene content over time. The mean values of the results of the five experiments and also the maximum positive and negative deviation from the mean for the particular samples are evaluated:

| Reaction time [min] | Benzene content (mean of the 5 experiments, GC area %) | Maximum negative deviation from the mean | Maximum positive deviation from the mean |
|---|---|---|---|
| (0, Starting solution) | 5.394% | 0 | 0 |
| 10 | 4.222% | 0.278 | 0.202 |
| 20 | 3.384% | 0.319 | 0.257 |
| 30 | 2.748% | 0.214 | 0.079 |
| 40 | 2.200% | 0.078 | 0.165 |
| 60 | 1.040% | 0.189 | 0.090 |
| 90 | 0.273% | 0.112 | 0.124 |
| 120 | 0.036% | 0.030 | 0.058 |
| 180 | 0% | 0 | 0.001 |
| 240 | 0% | 0 | 0 |

Result:

The results of the four hydrogenation examples (8, 9, 12 and 13) demonstrate that, when approximately the same ruthenium content is used, catalyst G (inventive) (0.32% Ru D11-10, 3 mm) with coating structure is the more active catalyst in comparison to catalyst B (comparative) (0.70% Ru D11-10, 3 mm). This is true both at a hydrogen pressure of 20 bar (comparison of hydrogenation examples 8 and 12) and at a hydrogen pressure of 32 bar (comparison of hydrogenation examples 9 and 13).

Continuous Hydrogenation of Benzene to Cyclohexane:

The experiment is performed in a continuous jacketed reactor (Ø 12 mm, length: 1050 mm) with three oil heating circuits distributed uniformly over the reactor length, which is operated with liquid circulation under quantitative control (HPLC pump) in continuous trickle mode. The experimental plant is also equipped with a separator for separating gas and liquid phase with level control, offgas regulator, external heat exchanger and sampler. The hydrogen is metered under pressure control (in bar); the hydrogen added in excess is measured under quantitative control (in 1 (STP)/h); the benzene feedstock is metered by means of an HPLC pump. The product is discharged under level control via a valve. The temperature is measured with a thermoelement at the start (inlet) and at the end (outlet) of the reactor or of the catalyst bed.

For comparison, the two coated ruthenium catalysts

1) Catalyst A (comparative) (0.5% Ru) (0.47% Ru/Al₂O₃, batch 20014273), 104 ml, 619 g (hydrogenation example 14)
2) Catalyst G (0.32% Ru/SiO2 D11-10 support, 3 mm), 104 ml, 45.0 g (hydrogenation example 15)

are compared with the ruthenium catalyst

3) Catalyst B (0.70% Ru/SiO2 D11-10 support, 3 mm), 104 ml, 49.9 g (hydrogenation example 16)

The experiments for continuous hydrogenation are performed at a hydrogen pressure of 32 bar, at an amount of offgas of 1-3 1 (STP)/h, a reactor inlet temperature of 88-90° C. and a feed/circulation ratio of 1:30.

Hydrogenation Example 14

Continuous Hydrogenation of Benzene with Catalyst A (0.5%), (0.47% Ru/Al$_2$O$_3$, Batch Number 20014273)

| Pressure [bar] | Running time [h] | Benzene feed [g/h] | Circulation [g/h] | Reactor inlet temperature [° C.] | Reactor outlet temperature [° C.] | C5 alkanes [GC area ppm] | n-hexane [GC area ppm] | Methyl-cyclopentane [GC area ppm] | Benzene | Cyclohexane [GC area %] | Methyl-cyclohexane [GC area ppm] | Ethyl-cyclopentane [GC area ppm] | Toluene [GC area ppm] | Others |
|---|---|---|---|---|---|---|---|---|---|---|---|---|---|---|
| Feedstock | | | | | | 9 | 0 | 14 | 99.9763 [GC area %] | 65 [GC area ppm] | 44 | 25 | 37 | 43 |
| 32 | 22 | 62 | 1860 | 92 | 130 | 20 | 134 | 34 | 303 | 99.9340 | 77 | 25 | 0 | 67 |
| 32 | 49 | 62 | 1860 | 90 | 129 | 23 | 163 | 33 | 296 | 99.9311 | 77 | 26 | 0 | 71 |
| 32 | 94 | 62 | 1860 | 90 | 129 | 20 | 172 | 35 | 187 | 99.9430 | 75 | 25 | 0 | 56 |
| 32 | 142 | 62 | 1860 | 90 | 129 | 20 | 171 | 35 | 239 | 99.9380 | 75 | 25 | 0 | 55 |
| 32 | 239 | 62 | 1860 | 90 | 129 | 21 | 173 | 34 | 292 | 99.9325 | 74 | 24 | 0 | 57 |
| 32 | 286 | 62 | 1860 | 90 | 129 | 20 | 174 | 34 | 322 | 99.9291 | 77 | 25 | 0 | 57 |
| 32 | 404 | 62 | 1860 | 89 | 128 | 19 | 173 | 34 | 355 | 99.9259 | 78 | 25 | 0 | 57 |
| 32 | 468 | 62 | 1860 | 90 | 128 | 22 | 201 | 36 | 258 | 99.9326 | 77 | 25 | 0 | 55 |
| 20 | 540 | 62 | 1860 | 90 | 126 | 23 | 202 | 36 | 300 | 99.9282 | 76 | 25 | 0 | 56 |
| 20 | 588 | 62 | 1860 | 90 | 129 | 28 | 213 | 36 | 331 | 99.9235 | 77 | 25 | 0 | 55 |
| 20 | 698 | 62 | 1860 | 90 | 130 | 22 | 200 | 35 | 348 | 99.9217 | 78 | 24 | 0 | 76 |

Hydrogenation Example 15

Continuous Hydrogenation of Benzene with Catalyst G (Inventive) (0.32% Ru/Sio2 D11-10 Support, 3 mm)

| Pressure [bar] | Running time [h] | Benzene feed [g/h] | Circulation [g/h] | Reactor inlet temperature [° C.] | Reactor outlet temperature [° C.] | C5 alkanes [GC area ppm] | n-hexane [GC area ppm] | Methyl-cyclopentane [GC area ppm] | Benzene | Cyclohexane [GC area %] | Methyl-cyclohexane [GC area ppm] | Ethyl-cyclopentane [GC area ppm] | Toluene [GC area ppm] | Others |
|---|---|---|---|---|---|---|---|---|---|---|---|---|---|---|
| Feedstock | | | | | | 9 | 0 | 8 | 99.9728 [GC area %] | 0 [GC area ppm] | 55 | 29 | 135 | |
| 32 | 82 | 63 | 1860 | 90 | 128 | 35 | 213 | 19 | 0 | 99.9475 | 195 | 30 | 0 | 33 |
| | 177 | 63 | 1860 | 90 | 128 | 30 | 196 | 17 | 0 | 99.9499 | 194 | 30 | 0 | 34 |
| | 296 | 63 | 1860 | 89 | 128 | 29 | 185 | 18 | 0 | 99.9512 | 195 | 30 | 0 | 31 |
| | 416 | 63 | 1860 | 90 | 128 | 24 | 169 | 17 | 0 | 99.9526 | 196 | 31 | 0 | 37 |
| | 512 | 63 | 1860 | 100 | 139 | 45 | 370 | 23 | 0 | 99.9299 | 197 | 31 | 0 | 35 |
| | 680 | 63 | 1860 | 100 | 139 | 42 | 331 | 22 | 0 | 99.9344 | 194 | 30 | 0 | 37 |
| | 802 | 63 | 1860 | 100 | 139 | 37 | 308 | 21 | 0 | 99.9375 | 195 | 31 | 0 | 33 |
| | 921 | 63 | 1860 | 100 | 139 | 37 | 304 | 23 | 0 | 99.9371 | 197 | 31 | 0 | 37 |
| | 993 | 63 | 1860 | 100 | 139 | 37 | 305 | 22 | 0 | 99.9438 | 144 | 24 | 0 | 30 |

Hydrogenation Example 16

Continuous Hydrogenation of Benzene with Catalyst B (Comparative) (0.70% Ru/SiO2 D11-10 Support, 3 mm)

| Pressure [bar] | Running time [h] | Benzene feed [g/h] | Circulation [g/h] | Reactor inlet temperature [° C.] | Reactor outlet temperature [° C.] | C5 alkanes [GC area ppm] | n-hexane [GC area ppm] | Methyl-cyclopentane [GC area ppm] | Benzene | Cyclohexane [GC area %] | Methyl-cyclohexane [GC area ppm] | Ethyl-cyclopentane [GC area ppm] | Toluene [GC area ppm] | Others |
|---|---|---|---|---|---|---|---|---|---|---|---|---|---|---|
| Feedstock | | | | | | 9 | 0 | 9 | 99.9646 [GC area %] | 86 [GC area ppm] | 55 | 30 | 134 | 31 |
| 32 | 80 | 62.4 | 1860 | 88 | 127 | 11 | 23 | 15 | 0 | 99.9617 | 187 | 37 | 0 | 42 |
| 32 | 151 | 62.4 | 1860 | 90 | 128 | 11 | 91 | 16 | 0 | 99.9614 | 193 | 32 | 0 | 43 |

| Pressure [bar] | Running time [h] | Benzene feed [g/h] | Circulation [g/h] | Reactor inlet temperature [° C.] | Reactor outlet temperature [° C.] | C5 alkanes | n-hexane | Methyl-cyclo-pentane | Benzene | Cyclo-hexane [GC area %] | Methyl-cyclo-hexane | Ethyl-cyclo-pentane | Toluene | Others |
|---|---|---|---|---|---|---|---|---|---|---|---|---|---|---|
| | | | | | | | | [GC area ppm] | | | | [GC area ppm] | | |
| 32 | 295 | 62.4 | 1860 | 89 | 127 | 11 | 86 | 15 | 0 | 99.9623 | 195 | 31 | 0 | 39 |
| 32 | 415 | 62.4 | 1860 | 89 | 127 | 10 | 79 | 14 | 0 | 99.9631 | 196 | 31 | 0 | 39 |
| 32 | 487 | 62.4 | 1860 | 90 | 128 | 17 | 77 | 15 | 0 | 99.9636 | 196 | 31 | 0 | 28 |
| 32 | 607 | 62.4 | 1860 | 89 | 128 | 18 | 76 | 14 | 0 | 99.9638 | 196 | 31 | 0 | 27 |
| 32 | 707 | 62.4 | 1860 | 89 | 127 | 19 | 82 | 15 | 0 | 99.9633 | 194 | 31 | 0 | 26 |
| 32 | 894 | 62.4 | 1860 | 90 | 127 | 19 | 77 | 15 | 3 | 99.9633 | 196 | 30 | 0 | 27 |
| 20 | 942 | 62.4 | 1860 | 89 | 128 | 33 | 136 | 22 | 18 | 99.9532 | 196 | 31 | 0 | 32 |
| 20 | 1035 | 62.4 | 1860 | 90 | 128 | 32 | 148 | 19 | 15 | 99.9528 | 197 | 30 | 0 | 31 |
| 20 | 1064 | 62.4 | 1860 | 89 | 128 | 32 | 146 | 19 | 18 | 99.9531 | 196 | 30 | 0 | 28 |

Hydrogenation of Phenol

The performance is according to "GED" method, but the following parameters are changed: The feedstock used is a solution of 37.6 g of phenol (Riedel de Haen, Article number 3350017) and 712.4 g of cyclohexanol (Riedel de Haen, Article number 24217).

| Pressure: | 32 bar |
|---|---|
| Temperature: | 160° C. |
| Catalysts used: | 9.0 g of catalyst G (inventive) (0.32% Ru/SiO$_2$ D11-10 support, 3 mm) |
| | 9.9 g of catalyst B (comparative) (0.70% Ru/SiO$_2$ D11-10 support, 3 mm) |
| | 14.0 g of catalyst A (comparative) (0.5%) (0.47% Ru/Al$_2$O$_3$, batch 20014273) |

Analysis:

The residue content of phenol and the increase in the cyclohexanol content are determined by gas chromatography (data in GC area %):

| Instrument: | HP 5890-2 with sampler |
|---|---|
| Column: | 30 m ZB1 (Zebron, from Phenomenex) Film thickness: 1 μm, internal column diameter: 0.25 mm |
| Sample volume: | 1 μl |
| Carrier gas: | Helium |
| Flow rate: | 100 ml/min |
| Injector temperature: | 200° C. |
| Detector: | FID |
| Detector temperature: | 250° C. |
| Temperature program: | 5 min at 50° C., 10° C./min up to 300° C. |

A sample was taken after reaction times of 20, 40, 60, 90, 120, 150, 180, 240 and 360 minutes.

Evaluation:

The tables which follow list the decrease in the phenol content and the increase in the cyclohexanol content over time. The difference from 100 GC area % results from secondary components which are not listed in the evaluation.

| | Catalyst G (inventive) | | Catalyst B (comparative) | | Catalyst A (comparative) | |
|---|---|---|---|---|---|---|
| Reaction time [h] | Phenol [GC area %] | Cyclo-hexanol [GC area %] | Phenol [GC area %] | Cyclo-hexanol [GC area %] | Phenol [GC area %] | Cyclo-hexanel [GC area %] |
| 0 | 5.86 | 93.26 | 5.95 | 93.11 | 5.80 | 93.20 |
| 20 | 3.23 | 94.93 | 4.10 | 94.31 | 5.18 | 93.79 |
| 40 | 1.91 | 95.30 | 3.12 | 94.48 | 4.54 | 93.98 |
| 60 | 0.65 | 97.16 | 2.15 | 96.13 | 3.12 | 95.70 |
| 90 | 0.00 | 98.23 | 0.90 | 97.55 | 1.22 | 97.59 |
| 120 | 0.00 | 98.31 | 0.25 | 97.76 | 0.63 | 97.92 |
| 150 | 0.00 | 98.16 | 0.00 | 97.83 | 0.22 | 98.58 |
| 180 | 0.00 | 98.32 | 0.00 | 98.90 | 0.00 | 98.88 |
| 240 | 0.00 | 97.98 | 0.00 | 97.80 | 0.00 | 98.83 |
| 360 | 0.00 | 98.25 | 0.00 | 98.39 | 0.00 | 98.82 |

Result:

Coated catalyst G (inventive) is the most active of the three tested ruthenium catalysts under the selected reaction conditions.

Hydrogenation of Diisononyl Phthalate to Dinonyl Cyclohexane-1,2-Dicarboxylate with Coated Catalyst G (Inventive)

Diisononyl phthalate from BASF ("Palatinol® N", CAS No. 28553-12-0, abbreviation according to DIN EN ISO 1043-3: DINP) with an ester content of >99.5 GC area % is used.

The procedure is according to "GED" method (see benzene hydrogenation), but the following parameters are changed: The experiments are performed at a rotational speed of 500 rpm. At room temperature (25° C.), 50 bar of hydrogen are injected by means of the Büchi unit, the reaction temperature is adjusted to 130° C. and then the hydrogen pressure is increased by 50 bar per hour up to 200 bar. Consumed hydrogen is replaced via the Büchi unit and the target pressure of 200 bar is maintained.

The feedstock is 750 g of diisononyl phthalate (BASF, "Palatinol® N", lot No. 71245768E0).

Amount of catalyst used: 13.7 g of catalyst G (0.32% Ru/SiO$_2$ D11-10 support, 3 mm)

Analysis:

The residual content of DINP is determined by quantitative UV/VIS determination (method description below); the content of by-products is determined by gas chromatography (method description see below). Samples are taken after reaction times of 3, 6, 9, 12, 15, 18 and 24 hours.

Evaluation: The table which follows lists the decrease in the DINP content over time.

| Catalyst G (0.32% Ru/SiO₂ D11-10 support, 3 mm) | |
|---|---|
| Reaction time [h] | Residual DINP content (quant. UV/VIS) |
| 3 | 31.1% by wt. |
| 6 | 11.9% by wt. |
| 9 | 4.2% by wt. |
| 12 | 0.47% by wt. |
| 15 | 585 ppm by wt. |
| 18 | 45 ppm by wt. |
| 24 | >30 ppm by wt. |

After reaction time 18, the residual content of DINP is <100 ppm by weight.

The content of impurities of the sample after a reaction time of 18 h was determined by gas chromatography (procedure see Appendix 5). The sample comprised a total of 0.89% by weight of impurities.

Method Description

Ion Chromatography Determination of Traces of Sulfur in Organic Liquids (Benzene/Cyclohexane)

Sample Preparation

About 4-6 g of the sample are mixed with acetone in a ratio of 1:1 and then combusted in a hydrogen-oxygen gas flame in a Wickbold Combustion apparatus.

The combustion condensate is collected in an alkaline receiver (40 mmol of KOH).

Analysis

In the alkaline receiver, the sulfur is determined as sulfate by ion chromatography.

Analysis Conditions:

| | |
|---|---|
| Ion chromatography system: | for example modular system from Metrohm |
| Precolumn: | DIONEX AG 12, 4 mm |
| Separating column: | DIONEX AS 12, 4 mm |
| Eluent: | 2.7 mM Na2CO3 and 0.28 mM NaHCO3 |
| Flow rate: | 1 ml/min |
| Detection: | Conductivity after chemical suppression |
| Suppressor: | for example MSM from Metrohm |

Reagents Used:

| | |
|---|---|
| KOH | Merck Suprapure, article number 1.050.020.500 |
| NaHCO3 | Riedel de Haen p.A., article number 31437 |
| Na2CO3 | Merck Suprapure, article number 1.063.950.500 |
| Acetone | Merck Suprasolv, article number 1.0012.1000 |

Limit of determination for sulfur calculated for the sample: 0.1 mg/kg.

GC Method (Benzene/Cyclohexane)

The benzene feedstock and benzene-containing cyclohexane solution and also the reaction effluent are analyzed by gas chromatography (GC area %):

| | |
|---|---|
| Instrument: | HP 5890-2 with sampler |
| Range: | 4 |
| Column: | 30 m DB1, film thickness: 1 µm, internal column diameter: 0.25 mm |
| Sample volume: | 5 µl |
| Carrier gas: | Helium |
| Flow rate: | 100 ml/min |
| Injector temperature: | 200° C. |
| Detector: | FID |
| Detector temperature: | 250° C. |
| Temperature program: | 6 min at 40° C., 10° C./min up to 200° C. for 8 min, total run time 30 min |

UV/VIS Spectroscopy Determination of the Residual Aromatics Content in dinonyl cyclohexane-1,2-dicarboxylate (Branched or Linear)

By means of UV/VIS spectroscopy, the content of residual aromatics in dinonyl cyclohexane-1,2-dicarboxylate (branched or linear) (M=424.67 g/mol. $C_{26}H_{48}O_4$) is determined. The method is based on the presence of a UV chromophore (aromatic ring) in the analyte.

The method serves to determine the concentration of diisononyl phthalate ("DINP", Palatinol N, M=418.62 g/mol, $C_{26}H_{42}O_4$) in dinonyl cyclohexane-1,2-dicarboxylate (branched or linear) in the concentration range from 0 ppm (m/m) to about 2065 ppm (m/m).

Sample Preparation

For samples up to a concentration of <2000 ppm, no further reagents are required for work up for the UV measurement. The sample solutions can be analyzed directly without preparation.

Samples with a concentration of >2000 ppm are diluted with methanol for the UV analysis to such an extent that the absorption at the evaluation wavelength of 275 nm is <1.2. The content of DINP is then calculated for the starting concentration.

Specificity

Components which have an absorption at the evaluation wavelength of 275 nm cause a systematic error. The qualitative profile of the UV/VIS spectrum is an indication of whether such disruptive components are present.

Instruments and Working Materials

Instrument: Analytik Jena SPECORD 50 laboratory spectrometer (further details available at http://www.analytik-jena.de/d/bu/as/molec/vis/specord50.html)

2 mm quartz cuvette

Computer with appropriate evaluation program, WinAspect or AspectPlus

Pipettes or other customary laboratory devices for charging the analysis cuvette Methanol for dilution. At DNIP concentrations of >2000 ppm, the samples were used with methanol (Uvasol®, Methanol for UV spectroscopy) from Merck KGaA, Darmstadt, article number: 1.06002.0500):

Preparation of the Calibration Mixtures

For the determination of the calibration function, eight calibration mixtures with different content of dinonyl cyclohexane-1,2-dicarboxylate (branched or linear) were prepared. The stock solution used was dinonyl cyclohexane-1,2-dicarboxylate (branched or linear) (determination of content by GC 99.7% dinonyl cyclohexane-1,2-dicarboxylate (branched or linear), 0.21% DINP (Palatinol N) unhydrogenated). For supplementation, DINP (BASF, B4219 batch 85A/02, determination of content by GC 99.91% DINP) was used. From the solution resulting in each case, a small portion (approx. 100-300 mg) was taken for the UV analysis; the remaining solution was supplemented further with DINP. With reference to the different DINP calibration solutions with different DINP contents, a calibration function was determined.

Analysis Parameters
UV/VIS Spectroscopy:

| | |
|---|---|
| Cuvette material: | Quartz |
| Path length: | 2 mm |
| Reference: | Air |
| Analysis conditions: | RT |
| Analysis range: | 240-330 nm |
| Light source: | Deuterium and halogen lamp |
| Evaluation wavelength: | 275 nm |

UV/VIS Spectrum

The evaluation takes place at a wavelength of 275 nm.

For spectral pretreatment, an offset correction at the wavelength of 350 nm was performed.

Calculation of the Analysis Result

With reference to the calibration function determined from the calibration series, the absorption determined at 275 nm in the UV/VIS spectrum measured was converted to the Palatinol content of the sample according to equation (1):

$$c = 1803.1 * A_{275} - 50.5 \qquad (1)$$

c=mass concentration of DINP in ppm;
$A_{275}$=UV/VIS absorption of the sample at the wavelength of 275 nm.

The reproducibility of the analysis was checked by a triple repeat analysis of the calibration solution; the maximum absolute error of the Palatinol determination here was 26 ppm (calculated relative to weight) or 20 ppm (calculated relative to the mean), corresponding to relative error 1.26% and 0.97% respectively.

Test Method for Determining the Impurities in Monomer Plasticizers

Fields of Application:

This gas chromatography method is suitable for determining the impurities in monomer plasticizers in the concentration range from about 0.05% to 5%.

| | | |
|---|---|---|
| Instruments: | Gas chromatograph: | Hewlett Packard HP 5890 Series II |
| | Control and evaluation software: | Chromeleon 6.4 SP2 |
| | Column: | DB 1 capillary column Length 30 m, ID = 0.32 mm. df = 0.25 μm |
| | Analysis balance: | Sartorius (precision: ±0.1 mg) |
| | Duran ampoule: | (20 ml) |
| | Syringe: | 10 μl Hamilton syringe |
| Reagents: | Dimethyl phthalate (from BASF, Palatinol M) is used as an internal standard. | |
| Procedure: | Temperatures: Oven: | 90° C. 6° C./min → 290° C. |
| | Injector: | 300° C. |
| | Detector: | 300° C. |
| | Carrier gas: | Helium |
| | Pressure: | 150 kPa |

10 g (±0.1 mg) of the sample to be determined were weighed into a Duran ampoule with 0.005 g (±0.1 mg) of the appropriate Palatinol.

0.4 μl of this resulting solution was injected by direct injection with a 10 μl Hamilton syringe.

N.B.: cleanliness of the syringe is a prerequisite.

By means of the peak areas obtained from the chromatograph and the sample weight and standard weight, the content of impurities in g/100 g is reported.

The main component is excluded from the integration.

The impurities are calculated with the correction factor of 1 relative to the internal standard.

Calculation:

$$m(imp.) = \frac{A(imp.) * m(IS)}{A(IS)}$$

$$\sum c(imp.) = \frac{m(imp.) * 100}{m(\text{sample})} = [\%]$$

M(imp.)=mass of the impurity to be determined
A(imp.)=peak area of the impurity to be determined
A(IS)=peak area of the internal standard
m(IS)=weight of the internal standard
m(sample)=weight of the sample
$\Sigma c(imp.)$=sum of the impurities in g/100 g (%)

Reporting of the result Reporting of the content in percent to 0.01% precision based on sample in supply form.

The internal standard used for the determination of impurities in the monomer plasticizer diisononyl phthalate ("DINP", Palatinol N) and dinonyl cyclohexane-1,2-dicarboxylate (branched or linear) is dimethyl phthalate (Palatinol M).

What is claimed is:

1. A coated catalyst comprising, as an active metal, ruthenium alone or together with at least one further metal of transition groups IB, VIIB or VIII of the Periodic Table of the Elements (CAS version), applied to a support material consisting of silicon dioxide at least to an extent of 90% by weight and the remaining up to 10% by weight of the support material being selected from the group consisting of MgO, CaO, $TiO_2$, $ZrO_2$, $Fe_2O_3$, and alkali metal oxide, or a mixture thereof, wherein the amount of the active metal is <1% by weight based on the total weight of the catalyst, and at least 60% by weight of the active metal is present in the coating of the catalyst up to a penetration depth of 200 μm, determined by SEM-EPMA (EDXS), wherein the catalyst is prepared by impregnating the support material once or more than once with a solution of ruthenium(III) acetate alone or together with a solution of at least one further salt of metals of transition groups IB, VIIB or VIII of the Periodic Table of the Elements (CAS version), drying and reduction, the solution of the at least one further salt of metals of transition groups IB, VIIB or VIII of the Periodic Table of the Elements being applicable in one or more impregnation steps together with the solution of ruthenium(III) acetate or in one or more impregnation steps separately from the solution of ruthenium (III) acetate.

2. The coated catalyst according to claim 1, wherein the amount of the active metal is from 0.1 to 0.5% by weight.

3. The coated catalyst according to claim 1, wherein at least 80% by weight of the active metal is present in the coating of the catalyst up to a penetration depth of 200 μm.

4. The coated catalyst according to claim 1, wherein the amount of active metal, based on the weight ratio of active metal to Si, on the surface of the coated catalyst is from 2 to 25%, determined by SEM-EPMA (EDXS).

5. The coated catalyst according to claim 1, wherein the ruthenium is present partly or fully in crystalline form.

6. The coated catalyst according to claim 1, wherein the coated catalyst additionally comprises alkaline earth metal ions ($M^{2+}$).

7. The coated catalyst according to claim 1, wherein the support material has a BET surface area (DIN 66131) in the range from 30 to 700 $m^2/g$.

8. The coated catalyst according to claim 1, which comprises less than 0.05% by weight of halide (determined by ion chromatography), based on the total weight of the catalyst.

9. A process for preparing a coated catalyst according to claim 1, comprising:
  a) impregnating the support material consisting of silicon dioxide at least to an extent of 90% by weight and the remaining up to 10% by weight of the support material being selected from the group consisting of MgO, CaO, $TiO_2$, $ZrO_2$, $Fe_2O_3$, and alkali metal oxide, or a mixture thereof once or more than once with a solution of ruthenium(III) acetate alone or together with a solution of at least one further salt of metals of transition groups IB, VIIB or VIII of the Periodic Table of the Elements (CAS version);
  b) subsequent drying; and
  c) subsequent reduction;
  the solution of the at least one further salt of metals of transition groups IB, VIIB or VIII of the Periodic Table of the Elements being applicable in one or more impregnation steps together with the solution of ruthenium(III) acetate or in one or more impregnation steps separately from the solution of ruthenium(III) acetate.

10. A process for hydrogenating an organic compound which comprises hydrogenatable groups, which comprises using a coated catalyst according to claim 1.

11. The process according to claim 10, wherein a carbocyclic aromatic group is part of an aromatic hydrocarbon which has the following general formula:

$$(A)-(B)_n$$

wherein A, B, and n are each defined as follows:
A is independently aryl or heteroaryl;
n is from 0 to 5, the remaining carbon atoms or heteroatoms of A not bearing any substituents B bear hydrogen atoms or, if appropriate, no substituents; and
B is independently selected from the group consisting of alkyl, alkenyl, alkynyl, substituted alkyl, substituted alkenyl, substituted alkynyl, heteroalkyl, substituted heteroalkyl, heteroalkenyl, substituted heteroalkenyl, heteroalkynyl, substituted heteroalkynyl, cycloalkyl, cycloalkenyl, substituted cycloalkyl, substituted cycloalkenyl, COOR wherein R is H, alkyl, substituted alkyl, cycloalkyl, substituted cycloalkyl, aryl or substituted aryl, halogen, hydroxyl, alkoxy, aryloxy, carbonyl, amino, amido, thio and phosphino.

12. The process according to claim 11, wherein A is phenyl, n is from 0 to 3 and B is $C_{1-6}$-alkyl, COOR wherein R is H or linear or branched $C_{1-12}$-alkyl, amino, hydroxyl or alkoxy.

13. The process according to claim 11, wherein the aromatic hydrocarbon is selected from the group consisting of benzene and alkyl-substituted benzenes, ethylbenzene, xylene, mesitylene and mixtures thereof.

14. The process according to claim 11, wherein the aromatic hydrocarbon is selected from the group consisting of phenol, alkyl-substituted phenols, bis(p-hydroxyphenyl) methane and bis(p-hydroxyphenyl)dimethylmethane.

15. The process according to claim 11, wherein the aromatic hydrocarbon is selected from the group consisting of aniline, alkyl-substituted aniline, N,N-dialkylaniline, diaminobenzene, bis(p-aminophenyl)methane and bis(p-aminotolyl)methane.

16. The process according to claim 11, wherein the aromatic hydrocarbon is selected from the group consisting of aromatic carboxylic acids and aromatic carboxylic esters.

17. The process according to claim 10, wherein the aldehyde is a mono- or disaccharide which is hydrogenated to a corresponding sugar alcohol.

18. The process according to claim 10, wherein the hydrogenation is effected in a fixed bed reactor.

19. The process according to claim 18, wherein benzene is hydrogenated at a temperature of from 75 to 170° C., and a pressure of from 10 to 45 bar, wherein the sulfur content of the benzene is <0.2 ppm by weight.

20. The process of according to claim 10, wherein the organic compound which comprises hydrogenated groups is selected from a carbocyclic aromatic group which is hydrogenated to the corresponding carbocyclic aliphatic group and from aldehydes which are hydrogenated to corresponding alcohols.

* * * * *